United States Patent
Guilley et al.

(10) Patent No.: US 11,824,986 B2
(45) Date of Patent: Nov. 21, 2023

(54) DEVICE AND METHOD FOR PROTECTING EXECUTION OF A CRYPTOGRAPHIC OPERATION

(71) Applicant: SECURE-IC SAS, Cesson-Sevigne (FR)

(72) Inventors: Sylvain Guilley, Paris (FR); Cédric Murdica, Rennes (FR)

(73) Assignee: SECURE-IC SAS, Cesson-Sevigne (FR)

( * ) Notice: Subject to any disclaimer, the term of this patent is extended or adjusted under 35 U.S.C. 154(b) by 0 days.

(21) Appl. No.: 16/956,363

(22) PCT Filed: Dec. 18, 2018

(86) PCT No.: PCT/EP2018/085592
§ 371 (c)(1),
(2) Date: Jun. 19, 2020

(87) PCT Pub. No.: WO2019/121747
PCT Pub. Date: Jun. 27, 2019

(65) Prior Publication Data
US 2020/0344056 A1    Oct. 29, 2020

(30) Foreign Application Priority Data
Dec. 22, 2017    (EP) ..................... 17306927

(51) Int. Cl.
*H04L 9/30* (2006.01)
*H04L 9/00* (2022.01)

(52) U.S. Cl.
CPC ............ *H04L 9/302* (2013.01); *H04L 9/004* (2013.01); *H04L 9/3066* (2013.01); *H04L 2209/04* (2013.01); *H04L 2209/08* (2013.01)

(58) Field of Classification Search
CPC ........ H04L 9/302; H04L 9/004; H04L 9/3066; H04L 2209/04; H04L 2209/08
See application file for complete search history.

(56) References Cited

U.S. PATENT DOCUMENTS

| | | | |
|---|---|---|---|
| 5,991,415 A | 11/1999 | Shamir | |
| 6,366,673 B1 * | 4/2002 | Hollmann | ............... H04L 9/302 380/28 |

(Continued)

OTHER PUBLICATIONS

Rauzy, et al., "Using Modular Extension to Provably Protect ECC Against Fault Attacks", International Ssociation for Crypto! Ogic Research on 1-39 Sep. 11, 2015. (Year: 2015).*

(Continued)

*Primary Examiner* — Saleh Najjar
*Assistant Examiner* — Devin E Almeida
(74) *Attorney, Agent, or Firm* — BakerHostetler

(57) ABSTRACT

There is provided a device for protecting the execution of a cryptographic operation from attacks, the cryptographic operation being implemented by a cryptographic algorithm, the cryptographic operation comprising at least one modular operation between a main base (m) representing a data block and at least one scalar (d) in at least one finite starting group. The device is configured to determine at least one intermediary group (E') different from the at least one starting group (E), the number of intermediary groups being equal to the number of starting groups E. The device is further configured to determine at least one final group (E") from the at least one starting group E and the at least one intermediary group E'. The base m being mapped to an auxiliary element (x) in the at least one intermediary group and to an auxiliary base (m") in the at least one final group E". The device performs a first elementary operation in each final group (E"i), the first elementary operation consisting in executing the modular operation between the auxiliary base (m") and (Continued)

an auxiliary scalar ($d_a$) in each final group E″, which provides at least one result, the auxiliary scalar ($d_a$) being determined from the auxiliary element (x) and from the main scalar (d). The device further performs a second elementary operation in each starting group E, the second elementary operation consisting in executing the modular operation between an additional auxiliary base and an additional auxiliary scalar $d'_b$ in each starting group, at least one of the additional auxiliary base and of the additional scalar being derived from the result of the first elementary operation.

17 Claims, 11 Drawing Sheets

(56) References Cited

U.S. PATENT DOCUMENTS

| | | | | |
|---|---|---|---|---|
| 7,404,089 | B1* | 7/2008 | Campagna | G06F 7/723 |
| | | | | 708/492 |
| 9,400,636 | B2* | 7/2016 | Meyer | H04L 9/3066 |
| 10,601,578 | B2* | 3/2020 | Joye | H04L 9/004 |
| 2002/0152252 | A1* | 10/2002 | Kaminaga | G06F 7/724 |
| | | | | 708/491 |
| 2009/0034720 | A1* | 2/2009 | Baek | H04L 9/3066 |
| | | | | 380/30 |
| 2009/0235089 | A1* | 9/2009 | Ciet | G06F 21/577 |
| | | | | 713/190 |
| 2010/0232599 | A1* | 9/2010 | Joye | G06F 7/725 |
| | | | | 380/28 |
| 2014/0016772 | A1* | 1/2014 | Yajima | H04L 9/0816 |
| | | | | 380/28 |
| 2016/0043863 | A1* | 2/2016 | Dupaquis | G06F 7/725 |
| | | | | 380/28 |
| 2016/0350077 | A1* | 12/2016 | Peeters | G06F 7/72 |
| 2017/0187529 | A1* | 6/2017 | Guilley | G06F 7/728 |
| 2018/0187529 | A1* | 7/2018 | Di Crescenzo | F16L 15/08 |

OTHER PUBLICATIONS

Rauzy, et al., "Using Modular Extension to Provably Protect ECC Against Fault Attacks", International Association for Cryptologic Research, pp. 1-40, Sep. 11, 2015.

Rauzy, et al., "Countermeasures Against High-Order Fault-Injection Attacks on CRT-RSA", International Association for Cryptologic Research, vol. 20140922:170936, pp. 1-22, Sep. 22, 2014.

Koblitz, "Advances in Cryptology", CRYPTO'96, vol. 1109 of Lecture Notes in Computer Science, pp. 104-113, 1996.

Berzati, et al., "Fault Analysis in Cryptography", Springer LNCS, chapters 7, 8, and 9, 2011.

Nguyen, et al., "The Insecurity of the Digital Signature Algorithm with Partially Known Nonces", J. Cryptology 15(3): pp. 151-176, 2002.

* cited by examiner

DEVICE AND METHOD FOR PROTECTING EXECUTION OF A CRYPTOGRAPHIC OPERATION

CROSS-REFERENCE TO RELATED APPLICATIONS

This application is a National Stage of International patent application PCT/EP2018/085592, filed on Dec. 18, 2018, which claims priority to foreign European patent application No. EP 17306927.9, filed on Dec. 22, 2017, the disclosures of which are incorporated by reference in their entirety.

BACKGROUND

The invention generally relates to data processing, and more particularly to methods, devices, and computer programs for protecting a cryptographic operation implemented by a cryptographic algorithm against attacks.

Cryptographic algorithms are generally used in data securing systems, such as cryptographic systems to ensure the privacy and authenticity of the messages transmitted over insecure or considered insecure (i.e. with insufficient security level) channels in a variety of devices or systems, such as embedded devices, smartcards, etc.

Asymmetric cryptographic systems (also referred to as "public-key" cryptographic systems) use a pair of keys comprising a public key and an associated private key to encrypt and decrypt a message in order to ensure that the message arrives securely without being intercepted nor corrupted by an unauthorized user.

An asymmetric cryptographic system may be subject to different types of attacks intended to access the data. A common type of attack consists in searching for the private key. The computational complexity of such attack depends on the number of bits comprised in the private key. An asymmetric cryptographic system is by construction thus more protected from this type of attack by selecting a private key made of a large number of bits. However, other types of attacks target cryptographic systems with keys comprised of a large number of bits. These attacks may use mathematical and/or analytical optimization to try to reduce the search space.

There also exist indirect attacks implemented against cryptographic systems based on analysis of the behavior of a cryptographic device, the cryptographic device being seen as a black box containing a known algorithm and an unknown key. Indirect attacks may be directed to a number of cryptosystems implementing cryptographic algorithms such as RSA (Rivest, Shamir, and Adleman) cryptosystems, or Elliptic Curve Cryptosystems (ECC). Such indirect attacks include "side-channel attacks" (SCA) which use information ("side-channel information" such as the power consumption of the cryptographic device) observed during the execution of the cryptography algorithm, to retrieve some secret information embedded in a cryptographic device (See Paul Kocher. Timing attacks on implementations of Diffie-Hellman, RSA, DSS, and other systems. In N. Koblitz, editor, Advances in Cryptology—CRYPTO'96, volume 1109 of Lecture Notes in Computer Science, pages 104-113. Springer-Verlag, 1996).

A particular type of side-channel attack that proved to be very efficient is realized through the injection of deliberate (malicious) faults into a cryptographic device and the observation of the corresponding erroneous outputs (differential fault analysis (DFA)). Such fault injection attacks limit the number of experiments needed to obtain the bits of the secret key.

Asymmetrical cryptosystems may be also subject to fault injection attacks, as disclosed in "Fault Analysis in Cryptography" (Marc Joye and Michael Tunstall, Springer LNCS, 2011, DOI: 10.1007/978-3-642-29656-7; ISBN 978-3-642-29655-0). An attacker may try to use a fault attack to reveal one bit of the secret such as for example safe errors on ECC, or even the full cryptosystem parameters, as in the BellCoRe attack against RSA when optimized with the Chinese Remainder Theorem (CRT).

RSA is a cryptography algorithm for encrypting/decrypting a message using a public key and a private key. CRT-RSA algorithm applies CRT to an RSA algorithm.

Elliptic Curve Cryptosystems (ECC) are considered as a powerful and popular alternative to RSA cryptosystems because they require shorter key sizes than RSA and improve the security level.

Some existing cryptographic systems use a cryptographic algorithm such as RSA or ECC that implements a cryptographic operation by executing one or more modular operation in one or more groups between a base representing a data block and a scalar, such as a modular exponentiation $m^e$ for RSA (m representing the base and e representing the scalar) or a scalar multiplication [d]P for ECC (P representing the base and d representing the scalar). Such modular operations executed by cryptosystems are generally performed in finite groups.

Such modular operations are at the basis of many public key cryptosystems (e.g. RSA, ECC, Diffie Hellman). In particular, cryptosystems based on modular exponentiation are particularly sensitive to implementation active and passive attacks.

More specifically, in a RSA cryptographic system, encryption and decryption are executed by power calculations. Specifically, the basic RSA cryptographic operation corresponds to an exponentiation operation $m^e$ modulo a modulus which is equal to pq, the base of the exponentiation operation being the message m, the exponent of the exponentiation operation corresponding to a public key e, p and q being integer and coprime and the public key e being prime to (p−1) and to (q−1).

Elliptic Curves Cryptography (ECC) consists in operations on a finite field $\mathbb{F}_q$, where q is the power of a prime. For each operation on the curve (doubling and addition—since the curve is a group), a few (typically about ten) multiplications are required. Elliptic curve cryptosystems are mainly based on execution of elliptic curve scalar multiplications [d]P.

A variety of countermeasure systems and methods have been proposed to protect cryptographic systems against such indirect attacks. However, in most existing countermeasure systems, the result of the modular operation (modular exponentiation or scalar multiplication) performed by the cryptographic operation can be exploited by an attacker.

Improved systems, methods, and computer program products for protecting asymmetric cryptographic systems against fault injection attacks are accordingly needed.

SUMMARY

In order to address these and other problems, there is provided a device for protecting the execution of a cryptographic operation from attacks, the cryptographic operation being implemented by a cryptographic algorithm, the cryptographic operation comprising at least one modular operation between a main base (m) representing a data block and at least one scalar (d) in at least one finite starting group. The device may comprise a group determination unit, the group determination unit being configured to:

determine at least one intermediary group (E') different from the at least one starting group (E), the number of intermediary groups being equal to the number of starting groups E;

determine at least one final group (E'') from the at least one starting group E and the at least one intermediary group E'.

The base m is mapped to an auxiliary element (x) in the at least one intermediary group and to an auxiliary base (m'') in the at least one final group E''. The device may further comprise an execution engine for executing each modular operation. The execution engine may comprise:

a first unit configured to perform a first elementary operation in each final group (E''i), the first elementary operation consisting in executing the modular operation between the auxiliary base (m'') and an auxiliary scalar ($d_a$) in each final group E'', which provides at least one result, the auxiliary scalar ($d_a$) being determined from the auxiliary element (x) and from the main scalar (d).

a second unit configured to perform a second elementary operation in each starting group E, the second elementary operation consisting in executing the modular operation between an additional auxiliary base and an additional auxiliary scalar $d'_b$ in each starting group, at least one of the additional auxiliary base and of the additional scalar being derived from the result of the first elementary operation.

In some embodiments, each modular operation between a base and a scalar in at least one given finite group may comprise one or more iterations of a basis operation on the base (m) in the at least one finite group modulo an integer representing the order of the at least one group, the at least one group being associated with a given internal law, the number of iterations being defined by the at least one scalar, the basis operation being defined by the internal law of the group.

In an embodiment, the device may be further configured to determine an auxiliary parameter ($d_b$) as a function of the main scalar (d) and of the at least one auxiliary scalar ($d_a$).

The main base may be associated with a given order (r), the product of the auxiliary scalar ($d_a$) and of the auxiliary parameter ($d_b$) being equal to the main scalar (d) modulo the order of the base (r).

The sum of the first auxiliary scalar ($d_a$) and of the auxiliary parameter ($d_b$) may be equal to the main scalar (d).

In an embodiment, the auxiliary element (x) may be determined from the auxiliary scalar ($d_a$) and the auxiliary parameter ($d_b$).

In an embodiment, the cryptographic algorithm may be a Rivest, Shamir, and Adleman (RSA) algorithm, the RSA cryptographic algorithm being associated with a private key d, a public key e and a first and second system parameters (p, q), the system parameter being coprime, the public key (e) being prime to the first second system parameter minus one, and to the second parameter minus one, the modular operation being a modular exponentiation performed in two starting groups, the modulus being equal to the product of the first and second system parameters (pq), the main scalar (d) corresponding to the public key.

In an embodiment, the auxiliary element (x) may be determined such that the auxiliary parameter ($d_b$) is equal to the auxiliary element (x) raised to the first auxiliary scalar ($d_a$), in the intermediary group, plus one.

The step of determining at least one intermediary group (E') may comprise determining at least two intermediary group (E'1, E'2).

In an embodiment, the auxiliary element (x) may be determined by solving an equation according to which the auxiliary parameter ($d_b$) is equal to the sum of the auxiliary element (x) raised to the first auxiliary scalar ($d_a$) in each intermediary group.

In an embodiment, the cryptographic algorithm may be an Elliptic Curve Cryptography algorithm lying on a given elliptic curve, and the cryptographic operation is a scalar multiplication between a binary number and a point of the elliptic curve defined in a coordinate system over a finite field, the binary point being a key.

In some embodiments, the auxiliary element (x) is determined such that the second auxiliary scalar ($d_b$) may be equal to one of the coordinate of the result point obtained by solving an equation according to which the auxiliary parameter ($d_b$) is equal to the auxiliary element x raised to the first auxiliary scalar in the intermediary group.

The additional auxiliary scalar ($d_b'$) may be the element corresponding to the result of the first elementary operation (s'') in the at least one intermediary group (E').

In an embodiment, the additional auxiliary base (s) is the element corresponding to the result of the first elementary operation (s'') in the at least one starting group (E).

The execution engine is further configured to determine the product of the result of the second elementary operation by the additional auxiliary base (s), the product ($m_a$) representing the result of the modular operation.

The auxiliary element (x) may be of order 2.

Further, in some embodiments, the at least one intermediary group may be determined randomly.

In another embodiment, the at least one intermediary group may be prime with the at least one starting group.

There is further provided a cryptosystem system for implementing a cryptographic algorithm in an electronic device, the cryptographic algorithm being based on the result of a cryptographic operation using at least one modular operation, wherein the cryptographic system comprises a device according to any of the preceding embodiments to perform the at least one modular operation.

There is also provided a method of protecting the execution of a cryptographic operation from attacks, the cryptographic operation being implemented by a cryptographic algorithm, the cryptographic operation comprising at least one modular operation between a main base (m) representing a data block and at least one scalar (d) in at least one finite starting group. The method may comprise:

determining at least one intermediary group (E') different from the at least one starting group (E), the number of intermediary groups being equal to the number of starting groups E;

determining at least one final group (E'') from the at least one starting group E and the at least one intermediary group E'.

The base m may be mapped to an auxiliary element (x) in the at least one intermediary group and to an auxiliary base (m'') in the at least one final group E''. The method may further comprise the steps of:

performing a first elementary operation in each final group (E''i), the first elementary operation consisting in executing the modular operation between the auxiliary base (m'') and an auxiliary scalar ($d_a$) in each final group E'', which provides at least one result, the auxiliary scalar ($d_a$) being determined from the auxiliary element (x) and from the main scalar (d).

performing a second elementary operation in each starting group E, the second elementary operation consisting in executing the modular operation between an additional auxiliary base and an additional auxiliary scalar $d'_b$ in each starting group, at least one of the additional auxiliary base and of the additional scalar being derived from the result of the first elementary operation.

There is also provided a computer program comprising instructions for carrying out the steps of the method.

BRIEF DESCRIPTION OF THE DRAWINGS

The accompanying drawings, which are incorporated in and constitute a part of this specification, provided for illustration purposes only, illustrate various embodiments of the invention and, together with the general description of the invention given above, and the detailed description of the embodiments given below, serve to explain the invention.

DETAILED DESCRIPTION

Embodiments of the invention provide methods, devices and computer programs for protecting a cryptographic operation implemented by a cryptographic algorithm.

Figure 1:
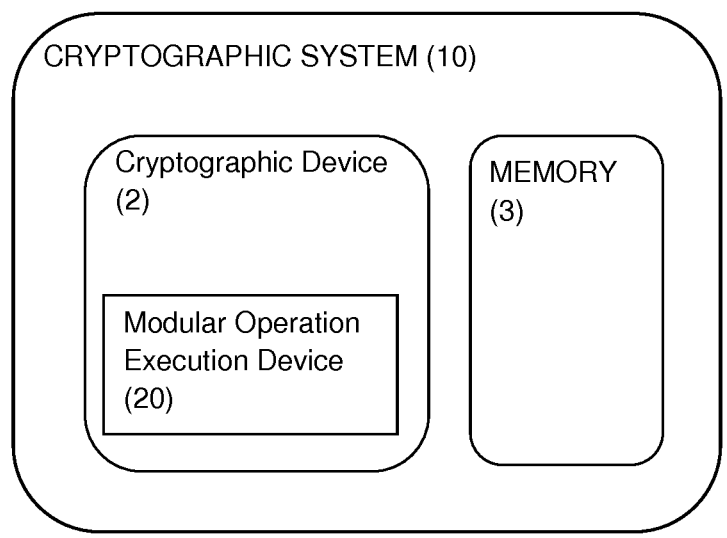
FIG. 1 represents a cryptographic system in accordance with some embodiments of the invention.

FIG. 1 shows a cryptographic system ("cryptosystem") 10, implementing one or more cryptographic mechanisms to ensure security, authentication, protection and privacy of data during the storage and/or the transmission of the data. The cryptographic mechanisms may employ cryptographic keys in order to generate ciphered data (also referred to as "ciphertext") from original data (also referred to as "plaintext") to prevent attacker from recovering the original data, while access to the input data requires access to the cryptographic keys used to encrypt the original data through a decryption mechanism.

The cryptosystem 10 may comprise a cryptographic device 2 configured to execute a cryptographic operation related to the cryptographic mechanism while protecting such execution from attacks. The cryptographic operation may be implemented by a cryptographic algorithm (for example ECC or RSA). The cryptographic operation comprises at least one modular operation in at least one finite starting group modulo a given modulus between:

a main base m, representing a data block, and at least one scalar (d),

Such operations used in a cryptosystem are "modular", since the reduction modulo the number of elements of the group allows to keep the intermediate data within a predefined range, namely between zero and the number of elements in the group, minus one. Therefore, the bit width of all values is predetermined, which contributes in a significant speed up of the computations.

As used herein, an operation defined "modulo a given modulus "n" (or "modular" operation) refers to an operation for which the remainder of the Euclidean Division of the operation result by the modulus n is determined such that the final operation result of the modular operation belongs to [0; n−1].

A "group" refers to an algebraic structure consisting of a set of elements and having an internal law defining a basis operation that combines any two elements (operands) to form a third element. For example, the basis operation for an operation executed in one or more groups (referred to hereinafter as "starting groups") may be the addition defined by the group internal law "+" (additive operator) if the one or more starting groups are additive, or the multiplication defined by the group internal law "×" (multiplicative operator) if the one or more starting groups are multiplicative. An example of an additive group is the group of integers. A finite group (group $\mathbb{Z}$ of integers for example) has an order (also referred to as the "group order") corresponding to the number of elements in the group. Advantageously, the group can be one particular operation of a larger algebraic structure, such as a ring or a field, typically used in cryptographic operations.

As used herein, "starting" group(s) (noted E for a unique starting group or (E1, . . . , El)) refer to the one or more group(s) in which the modular operation between the base and the one or more scalars is defined.

Further, as used herein, a "modular operation" defined in one or more starting groups between a base m and at least one scalar d designates one or more iterations of the internal law of the starting groups (the internal law defining a basis operation such as an addition or a multiplication) using the base m modulo a modulus, the number of iterations being defined from the at least one scalar. Each new iteration thus consists in applying the basis operation defined by the internal law of the starting groups between the result of the previous iteration and the base m, the first iteration consisting in applying the basis operation defined by the internal law between two operands, each being equal to the base. The modulus may be defined as the order of the one or more given groups.

Although the following description of some embodiments is made mainly with reference to a unique scalar d, the skilled person will readily understand that the invention also applies to modular operations using more than two scalars, such as for example multi-exponentiations (e.g. multiexponentiations called 'Shamir's trick').

If a modular operation is defined in two or more starting groups, the modulus may be defined as the product of the orders of the different starting groups.

If a modular operation is defined in a unique starting group, the modulus may be defined as the order of the group.

If the modular operation is performed between a base and two or more scalars, the number of iterations of the internal law of the starting group(s) corresponds to the products of the one or more scalars.

If the modular operation is performed between a base and a unique scalar, the number of iterations of the internal law of the starting group(s) corresponds to the scalar.

In one embodiment, the internal law of the starting group(s) may be defined by the multiplicative operator "×", the starting group(s) being thus multiplicative (e.g. in an RSA implementation), the modular operation is a modular exponentiation $m^d$ between a base m and the scalar d (the scalar d is also referred to as an "exponent" in such applications) which consists in repeatedly multiplying, (the multiplication being the basis operation corresponding to the internal law "×" of the starting group(s)), the base m by itself a number of times defined by the scalar d (or "exponent").

In another embodiment, the group law of the starting groups may be defined by the additive operator "+" if the starting group(s) are additive (e.g. in an ECC implementation). In such embodiment, the modular operation is a scalar multiplication dP between a base P and the scalar d which consists in repeatedly adding (the addition being the basis operation corresponding to the internal law "+" of the starting group(s)) the base P by itself a number of times defined by the scalar d (or "exponent").

The cryptographic system 10 may be for example a cryptographic system which implements a cryptographic algorithm for public key encryption/decryption by arithmetic operation. However, the invention is not limited to such application of the invention to key encryption/decryption and may be applied to other security related applications, such as digital signatures generation and verification.

In one embodiment, the cryptographic algorithm may be a Rivest, Shamir, and Adleman (RSA) algorithm associated with a private key d, a public key e and a first and second system parameters (p, q), the system parameters p and q being coprime, the public key e being prime to the first second system parameter minus one (p−1) and to the second parameter minus one (q−1). In an RSA cryptographic system, encryption and decryption are executed by power calculations in a remainder computation system. The RSA cryptographic algorithm comprises at least one cryptographic operation performed by executing at least one modular exponentiation in at least one multiplicative starting group, the group internal law of the starting group being defined by the multiplication operator "×". The modular operation in an RSA implementation of the invention is thus a modular exponentiation defined by $m^d$. In such RSA applications of the invention, the scalar d will be referred to also as an "exponent".

More specifically, a RSA cryptographic operation corresponds to a modular exponentiation, modulo a modulus n, with n being equal to the product of the first and second system parameters (pq), the base of the exponentiation operation being the message m and the scalar (or "exponent") of the exponentiation operation corresponding to the private key d:

$$s = m^d \bmod n$$

As a public key, the public key e is not a sensitive key. In contrast, the private key d is security sensitive.

Alternatively, the cryptographic system 10 may implement a ECC cryptographic algorithm (ECC stands for Elliptic Curve Cryptography) lying on a given elliptic curve, the cryptographic device 2 executing a cryptographic operation involving at least one modular operation corresponding to a scalar multiplication between a binary number and a point of the elliptic curve defined in a coordinate system over a finite field, the binary number being a key, or a sensitive value, whose knowledge can guide an attacker to the key (as described in Phong Q. Nguyen, Igor E. Shparlinski: "The Insecurity of the Digital Signature Algorithm with Partially Known Nonces". J. Cryptology 15(3): 151-176 (2002)).

In a RSA implementation of the invention, the modular operation is a modular exponentiation defined in two starting groups E1 and E2, the first starting group E1 corresponding to the integer group modulo p (E1=$\mathbb{Z}/p\mathbb{Z}$) and the second starting group E2 corresponding to the integer group modulo q (E2=$\mathbb{Z}/q\mathbb{Z}$), with p and q being the RSA system parameters of integer type, p and q being coprime.

Figure 2:
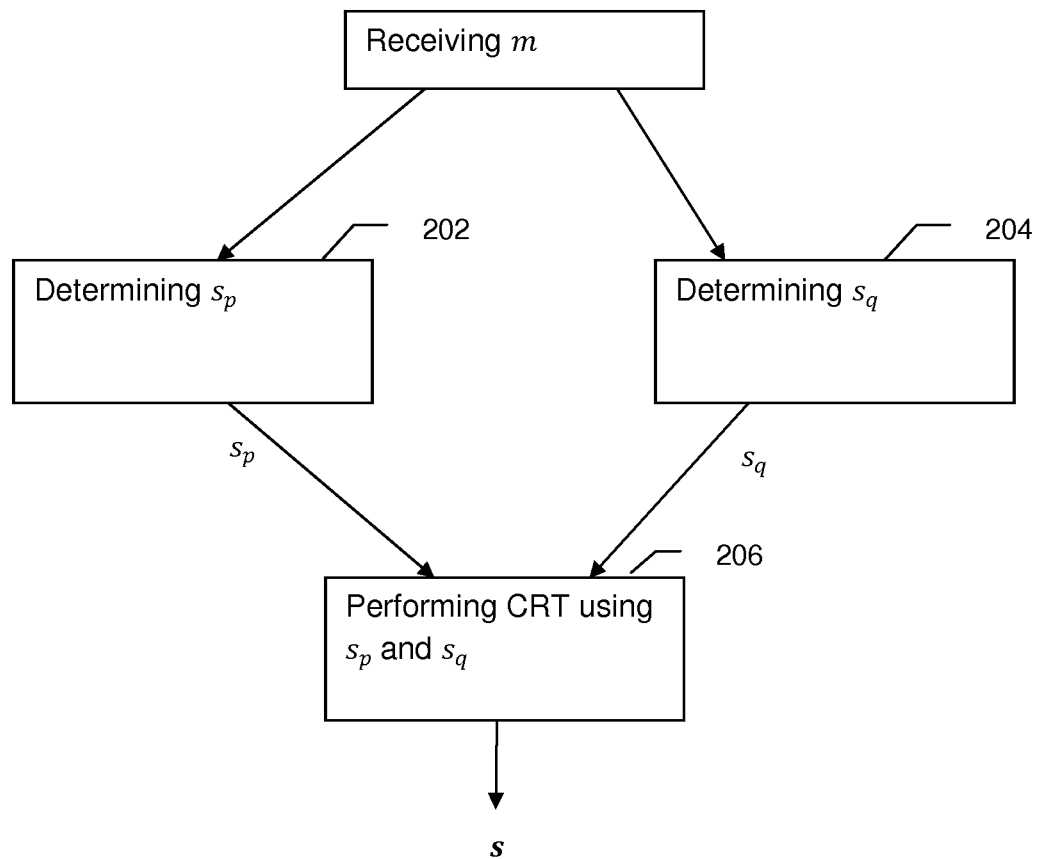
FIG. 2 is a flowchart depicting a conventional RSA exponentiation method according to the prior art.

FIG. 2 illustrates the steps performed to execute a RSA cryptographic operation in CRT mode (CRT is the acronym for Chinese Remainder Theorem), according to the prior art. An RSA cryptographic operation comprises at least one modular operation consisting in a modular exponentiation in two starting groups, as the internal law of the starting groups is defined by the multiplication (the internal law of the starting groups is "×").

The CRT mode of RSA is faster in execution than the basic RSA mode. In the CRT mode, two elementary exponentiations are conventionally performed with the key structured as a tuple of size 5:

$$(p, q, d_p = d \bmod (p-1), d_q = d \bmod (q-1), q_{inv} = q^{-1} \bmod p)$$

The elementary exponentiations comprise:
a first exponentiation in step 202:

$$s_p = m^{d_p} \bmod p \quad (1);$$

a second exponentiation in step 204:

$$s_q = m^{d_q} \bmod q \quad (2).$$

The results of the two elementary exponentiations (1) and (2) are then combined in step 206 using a CRT function, which provides the result of the modular exponentiation s:

$$s = \mathrm{CRT}(s_p, s_q) \quad (4)$$

The CRT function $\mathrm{CRT}(s_p, s_q)$ is defined as follows:

$$\mathrm{CRT}(s_p, s_q) = s_q + q(q_{inv}(s_p - s_q) \bmod p) \quad (5)$$

Figure 3:
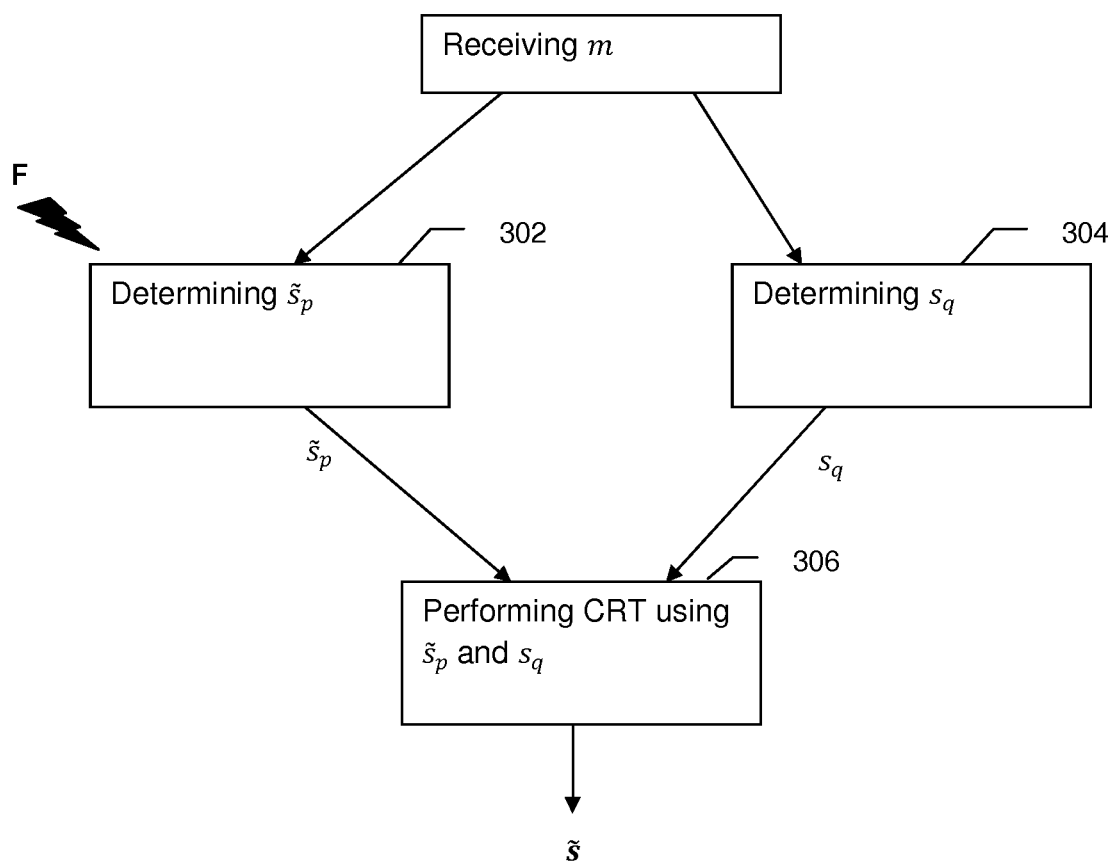
FIG. 3 is a flowchart illustrating fault injection during execution of a conventional RSA exponentiation method.

FIG. 3 is a flowchart illustrating the impact of a fault injection "F" on the RSA cryptographic operation as executed in the prior art. The fault can be induced physically by an external attack (using clock/power/reset glitches, underfeeding, etc.) or an internal attack (e.g., using Row-Hammer-kind of attack technique). When a fault is injected into one of the two elementary exponentiations ((1) or (2)) performed in steps 302 and 304, the result can be used for the factorization of the RSA key. For example, if a fault is injected in the first exponentiation (1), the faulty result of the first exponentiation (step 302) is noted:

$$\tilde{s}_p = m^{d_p} \bmod p \quad (3)$$

In conventional approaches, this faulty result might impact the result of the modular exponentiation noted $\tilde{s}$ and performed in step 306:

$$\tilde{s}=s_q+q(q_{inv}(\tilde{s}_p-s_q) \bmod p) \quad (6)$$

The results $\tilde{s}$ verifies:

$$\tilde{s}^e-m \neq 0 \bmod p \quad (7)$$

$$\tilde{s}^e-m = 0 \bmod q \quad (8)$$

The highest common factor between $\tilde{s}^e-m$ and n, noted $\gcd(\tilde{s}^e m, n)$, provides q, with e being the exponent of the public key hence known by the attacker.

In the prior art, countermeasures about such attacks targeting the exponentiations (1) and (2) comprise:
- countermeasures using several checks performed after each exponentiation (1) and (2) and the recombination (4). Error report is usually returned if at least one error is detected.
- countermeasures based on fault propagation. The countermeasures based on fault propagation include determining modification parameters m', $d_p$p' and q', and then performing:
  a first elementary exponentiation:

$$s_p'=m'^{d_{p'}} \bmod p'; \quad (1')$$

a second elementary exponentiation:

$$s_q'=m'^{d_{q'}} \bmod q'; \quad (2')$$

a modified $CRT(s_{p'},s_{q'})=(r, s')$ with r=1 if no error is detected; and
  determining the result s=s' $a^r$ mod n, where a refers to some redundant computation.

Conventional protection approaches, as disclosed for example in U.S. Pat. No. 5,991,415A, are based on steps performed after the exponentiation operations (1') and (2') (post operation checks) and are vulnerable to double faults. For example, if one effective fault is injected on one of the two exponentiations (1') or (2'), a second fault can be injected during the post operation checks (to set the check result r to a 'CORRECT status" instead of an 'ERROR' status). Further, conventional protection based on "error propagation", with an exponent r being required to be equal to one (r=1), is also vulnerable to double faults. For example, one effective fault can be injected on one of the two exponentiations (1') or (2'). The exponent r of the final exponentiation is indeed then obtained from the result of the two exponentiations. If the exponent r, as obtained is equal to 1, no fault occurred. However, in such approaches a second fault can be still introduced so that the last exponent r is not performed or faulted. This can be done for example by either freezing the circuit during the exponentiation or directly by faulting the exponent to set it to one (that is, a value which bypasses the "infective" countermeasure).

There is consequently a need for better protection of such secure executions.

The invention provides an improved protection during the execution of each cryptographic exponentiation of a cryptographic algorithm, and more generally of each modular operation between a main base m and a scalar d of a cryptographic algorithm, the modular operation being defined in at least one starting group, and consisting in a number d of iterations of the internal law of the starting groups using the main base m as operand. The disclosure is suitable for any cryptographic algorithm using at least one modular operation such as RSA or ECC.

Figure 4:
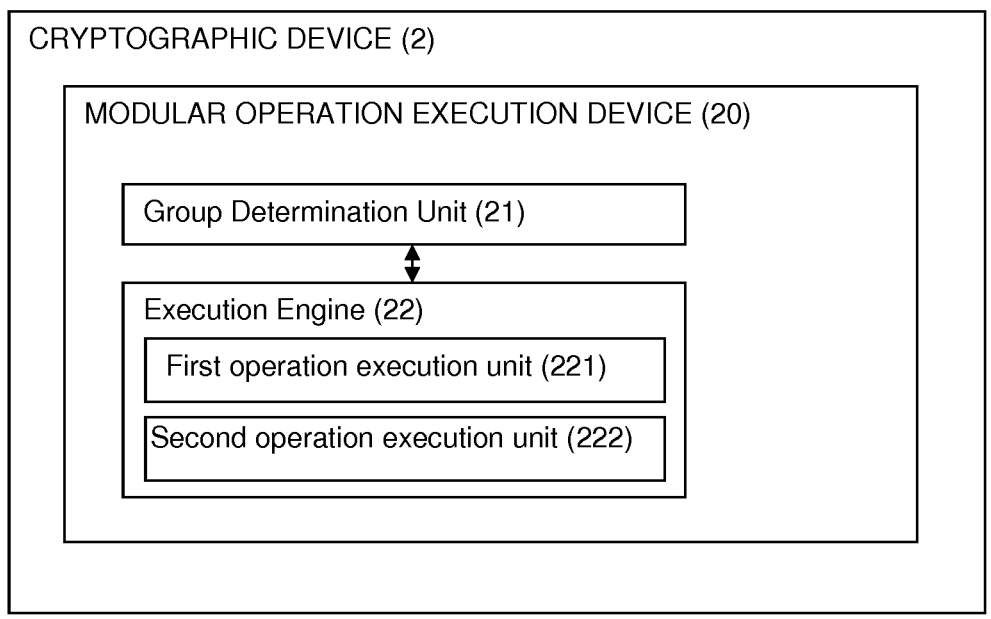
FIG. 4 represents a cryptographic engine in accordance with some embodiments of the invention.

Reference is now made to FIG. 4 which shows the cryptographic device 2 according to some embodiments allowing executing the cryptographic operation comprising at least one modular operation in one or more starting group noted E (or E1, E2, ..., EN) between a base m representing a data block and a scalar d, such as for example an exponentiation operation $m^d$ (the main scalar d being in such embodiment a main exponent).

The following description of some embodiments will be made with reference to starting groups which may be multiplicative groups (e.g. in a RSA implementation) or additive groups (e.g. in an ECC implementation).

As used herein, an additive group refers to a group such that each element $x_i$ of the group fulfils the following property:

$x_i+x_i+ \ldots +x_i=dx_i$, with d being a scalar.

The first term of the above equation comprises (d-1) additions.

As used herein, a multiplicative group refers to a group such that each element $x_i$ of the group fulfils the following property:

$x_i \cdot x_i \ldots x_i = x_i'$, with d being a scalar, also called "exponent".

The first term of the above equation comprises (d-1) multiplications.

As shown in FIG. 4, the cryptographic device may comprise a Modular Operation Execution device 20 (or MOE device) for executing each modular operation of the cryptographic algorithm. The modular operation execution device 20 may comprise a group determination unit 21 configured to determine at least one intermediary group $E'_i$ different from the one or more starting groups $E_i$. The number of intermediary groups $E'_i$ may be equal to the number of the starting groups $E_i$.

The group determination unit 21 may be further configured to determine at least one final group $E''_i$ from at least one starting group $E_i$ and at least one intermediary group $E'_i$. The number of the final groups $E''_i$ may be equal to the number of the starting groups $E_i$ and to hence to the number of intermediary groups $E'_i$. If the starting groups, the intermediary groups and the final group comprise a unique group, the starting group is denoted E, the intermediary group is denoted E', and the final group is denoted E".

The MOE device 20 may be configured to map the base m to an auxiliary element x in the intermediary group(s) $E'_i$ and to an auxiliary base m" in the final group(s) $E''_i$.

The MOE device 20 may further comprise an execution engine 22 for executing the modular operation (e.g. exponentiation operation). The mapping of the base m to the auxiliary element x and to the auxiliary base m" may be performed by a separate block provided in the MOE device 20 or by the execution engine 22.

The execution engine 22 may comprise:
- a first elementary operation execution unit 221 (e.g. first elementary exponentiation unit in a RSA implementation) configured to perform a first elementary operation in each final group (E"i),
- a second elementary operation execution unit 222 (e.g. second elementary exponentiation unit in a RSA implementation) configured to perform a second elementary operation in each starting group E.

The first elementary operation and the second elementary operations consist in the similar operation as the modular operation type used between a particular base and a scalar.

More specifically, the first elementary operation consists in a number of iterations of the internal law of the starting groups using an auxiliary base m" as operand, the number of iterations being defined by an auxiliary scalar $d_a$, in each final group E", which provides at least one result $s_1$. The auxiliary scalar $d_a$ may be determined from the auxiliary element x and from the main scalar d.

Further, in such embodiment, the second elementary operation (thus corresponding to a second elementary exponentiation) may consist in a number of iterations of the internal law of the starting groups using an additional auxiliary base $m_b$ as operand, the number of iterations being defined by an additional auxiliary scalar $d'_b$, in each starting group E, which provides a result $s_2$, the additional auxiliary base $m_b$ and/or the additional scalar $d'_b$ being determined or derived from the result $s_2$ of the first elementary operation. The additional auxiliary base $m_b$ may be determined or derived from the main base m and/or from the result $s_1$ of the first exponentiation operation.

For example, if the modular operation is a modular exponentiation, the first elementary operation (thus corresponding to a first elementary exponentiation) may consist in raising the auxiliary base m" to an auxiliary scalar $d_a$ in each final group E", which provides at least one result: $s_1 = m''^{d_a}$;

Further, in such embodiment, the second elementary operation (thus corresponding to a second elementary exponentiation) may consist in raising an additional auxiliary base $m_b$ to an additional auxiliary scalar $d'_b$ in each starting group E, which provides a result $s_2 = m_b^{d'_b}$.

Whatever the result $s_2$, the embodiments of the invention thus advantageously ensure that such result cannot be used by an attacker to hack the system. Indeed, if $s_2$ is equal to $m^d$ in E, no fault occurred and the result is correct. If $s_2$ is not equal to $m^d$ in E, the result may be faulty but the result cannot be used by an attacker. This provides an infective behavior: the attacker cannot gain information on parameters p or q, owing to the randomization.

As used herein:
- an "intermediary" group (or a set of intermediary groups), noted E' (or E'1, ..., E'l), in relation with a modular operation (e.g. modular exponentiation $m^d$) defined in at least one starting group E refers to one or more groups different from the starting group(s): E'# E (or E'1# E1, E'2# E2, ..., E'l # El); each intermediary group E'i is associated with one of the starting groups Ei and may be determined randomly or according to some rules (for example E'i is prime with Ei). The number of intermediary groups is thus equal to the number of starting groups. For example, in an RSA implementation, two intermediary groups E'1, E'2 are associated with E1, E2, the intermediary groups corresponding for example to the integer group modulo p' (E'1=$\mathbb{Z}$/p'$\mathbb{Z}$) and the integer group modulo q' (E'2=$\mathbb{Z}$/q'$\mathbb{Z}$) with p' and q' being integers, and p and q coprime; p' and q' may be selected randomly;
- a "final" group (or a set of final groups), noted E" (or E"1, ..., E"l), in relation with modular operation (e.g. modular exponentiation $m^d$) defined in at least one starting group E refers to one or more groups; each final group E"i (or E" if only one starting group is considered) is derived from the corresponding starting group Ei (or E) and the corresponding intermediary group E'i (or E'). Each final group E"i is thus associated with one of the starting groups Ei and the corresponding intermediary group E'i. The number l of final groups is thus equal to the number of starting groups and to the number of intermediary groups.

It should be noted that, while in RSA a group is a group of units of a ring of integers modulo an integer n, in ECC, a group is an elliptic curve. Further, in ECC, the CRT is applied to the coefficients of the points and the points are element of the set.

Further, to facilitate the understanding of some embodiments of the invention, the following definitions are provided:
- the mapping of an element k of the starting groups E to an element k' of the intermediary groups E' or an element k" of the final groups E" is referred to an "extension". Accordingly m is "extended" to x in E' and to m" in E".
- the mapping of an element k" from the final groups E" to an element k' of the intermediary groups E' or to an element k of the starting groups E, or mapping an element k' of the intermediary groups E' to an element k of the starting groups E is referred to a "reduction". For example, m" is "reduced" to x in E' and to m in E. Further, x is reduced to m in E.

The order of an element k in a group refers to the smaller positive integer α such that $k^\alpha = 1$.

In an embodiment, the cryptographic device 2 may be configured to determine an auxiliary parameter $d_b$ as a function $g(d, d_a)$ of:
- the main scalar d, and
- the one or more auxiliary exponents $d_a$.

It should be noted that if the intermediary groups comprise at least two groups $E_1', \ldots, E_n'$ such for an RSA implementation of the invention in CRT mode, the auxiliary parameter $d_b$ corresponds to the addition or a function of the elementary auxiliary parameters $d_b^{(i)}$ obtained for each intermediary group $E_i'$.

In embodiments where the base m is associated with a given order noted "r", the auxiliary scalar $d_a$ may be determined such that the product of the auxiliary scalar $d_a$ with the auxiliary parameter $d_b$ may be equal to the main scalar d modulo the order of the base r:

$$d_a \cdot d_b = d \bmod r \qquad (9)$$

Alternatively, the auxiliary scalar $d_a$ may be determined such that the sum of the first auxiliary scalar $d_a$ and of the auxiliary parameter ($d_b$) is equal to the main scalar d:

$$d_a + d_b = d \qquad (10)$$

In some embodiments, the auxiliary element x may be determined from the auxiliary scalar $d_a$ and the auxiliary parameter $d_b$ depending on the cryptographic algorithm implemented by the cryptographic system.

In particular, if the cryptographic algorithm is a Rivest, Shamir, and Adleman (RSA) algorithm, the auxiliary element x may be determined such that the auxiliary parameter $d_b$ is equal to the auxiliary element x raised to the first auxiliary scalar $d_a$, in the intermediary group, plus one:

$$d_b = x^{d_a} + 1 \qquad (11)$$

In embodiments where the intermediary groups comprise at least two groups $E_1', \ldots, E_n'$ such for an RSA implementation of the invention in CRT mode, the auxiliary element x may be similarly determined by solving the equation $d_b = x^{d_a}$, according to which the auxiliary parameter ($d_b$) is equal to the sum of the auxiliary element (x) raised to the first auxiliary scalar ($d_a$) in each intermediary group $E_i'$.

In some embodiments, the auxiliary element x may be of order 2. In such embodiments, x being thus of order 2, if the first auxiliary scalar $d_a$ is further odd in that $x^{d_a} = x$ in group E', the first auxiliary scalar $d_a$ and the auxiliary parameter $d_b$ can be determined easily and quickly.

In some embodiments, the intermediary groups $E_i'$ may be determined randomly.

Further, the intermediary groups $E_i'$ may be determined to be prime with the corresponding starting groups $E_i$.

The additional auxiliary scalar $d_b'$ may be determined as being equal to the element that corresponds to the result of the first elementary operation $s_1''$ (for example first elementary exponentiation) in the intermediary group(s) $E'i$.

In some embodiments, the additional auxiliary base $m_b$ may be determined as being equal to the element that corresponds to the result of the first elementary operation $s_1''$ (for example first elementary exponentiation) in the starting group(s) $Ei$.

In one embodiment, in particular when the first auxiliary scalar $d_a$ and the auxiliary parameter $d_b$ first satisfy $d_a+d_b=d$, the execution engine 22 may be further configured to determine the product $m_d = s_2 \cdot m_b$ of the result of the second elementary operation $s_2$ (for example second elementary exponentiation) by the additional auxiliary base $m_b$, the result $m_d$ thus obtained representing the result of the modular operation (e.g. $m_d = m^d$ for a modular exponentiation). Accordingly, the infection does not follow two different paths, which advantageously does limit the risk of double fault attacks.

Figure 5:
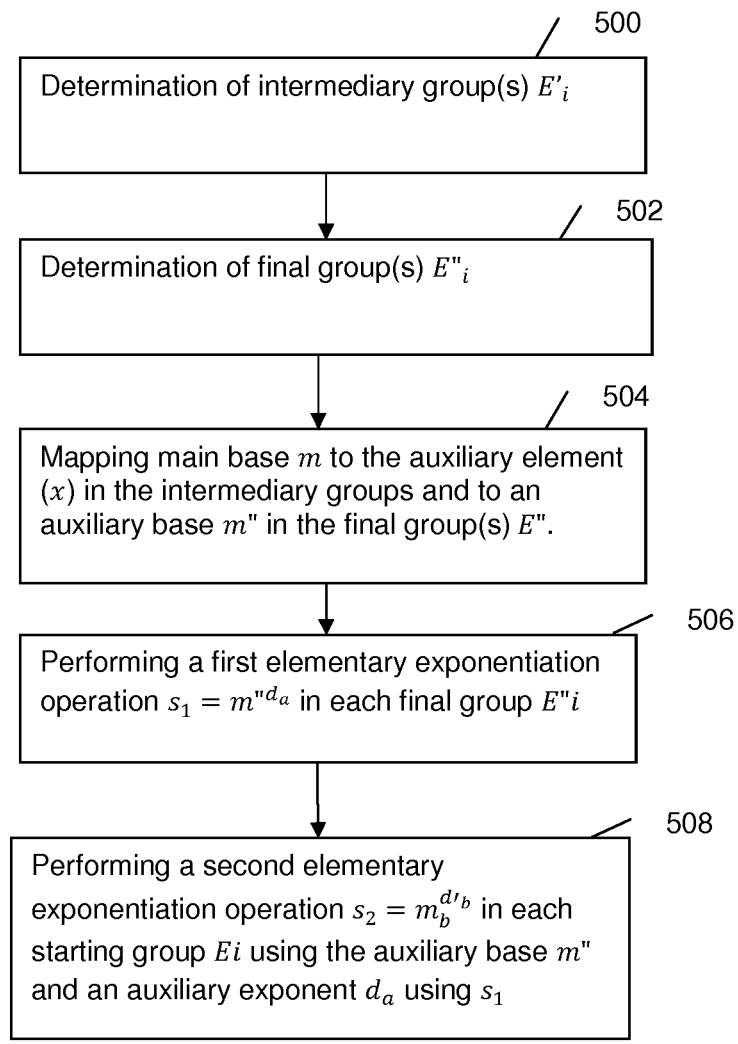
FIG. 5 is a flowchart that depicts a method of protecting execution of a modular operation according to some embodiments.

FIG. 5 is a flowchart depicting the modular operation execution method for protecting the execution of a cryptographic operation from attacks, according to some embodiments. In this embodiment, the cryptographic operation is implemented by a cryptographic algorithm, such as ECC or RSA, the cryptographic operation comprising at least one modular operation between a main base m and a scalar d (the modular operation consisting in d iterations of the internal law of the starting groups using the main base m as operand). The following description of FIG. 5 will be made with reference to a modular operation corresponding to a modular exponentiation $m^d$ for simplification and illustration purpose only.

In step 500, the one or more intermediary groups $E'_i$ different from the starting groups $E_i$ are determined.

In step 502, the one or more one final groups $E''_1$ are determined from at least one starting group $E_i$ and at least one intermediary group $E'_i$.

In step 504, the base m is mapped to the auxiliary element (x) in the one or more intermediary groups and to the auxiliary base m" in the one or more final group(s) E". In other words, the base m is extended in the final group E" which provides the auxiliary base m", m" being equal to the base m when reduced in the starting group E, and m" being equal to the element x when reduced in the intermediary group E'.

The exponentiation operation is then executed by performing the two exponentiation steps:

in step 506, the first elementary exponentiation operation is performed in each final group E"i, the first exponentiation operation consisting in raising the auxiliary base (m") to the auxiliary scalar $d_a$ in each final group E"i, which provides at least one result: $s_1 = m''^{d_a}$; the auxiliary scalar $d_a$ may be determined from the auxiliary element x and from the main scalar d;

in step 508, the second elementary exponentiation operation is performed in each starting group $E_i$, the second exponentiation operation consisting in raising an additional auxiliary base $m_b$ to the additional auxiliary scalar $d'_b$ in each starting group E, which provides a result $s_2 = m_b^{d'_b}$, at least one of the additional auxiliary base $m_b$ and the additional scalar $d'_b$ being determined or derived from the result $s_1$ of the first exponentiation operation.

The method thus obtained allows protection of the execution of the cryptographic operation, the method being tamper-resistant to fault attacks attempting to inject faulty results, such as a Bellcore attack. The infection (last step of the method) makes it possible to hide the interval values. As a result, the exploitation of faults internally is impossible because the effect of the infective countermeasure is to amplify and propagate faults, even if they are very localized (e.g., even one bit flip will affect the whole output). Further, a fault in the last step only provides with random data as, at this stage, no more secret or sensitive data is involved (hence faults have as sole effect to impede attacks).

Although FIG. 5 depicts the step of determining the auxiliary element x as being performed in step 504, alternatively such step may be performed in a previous step, after the determination of the intermediary group(s) E' done at step 502.

Figure 6:
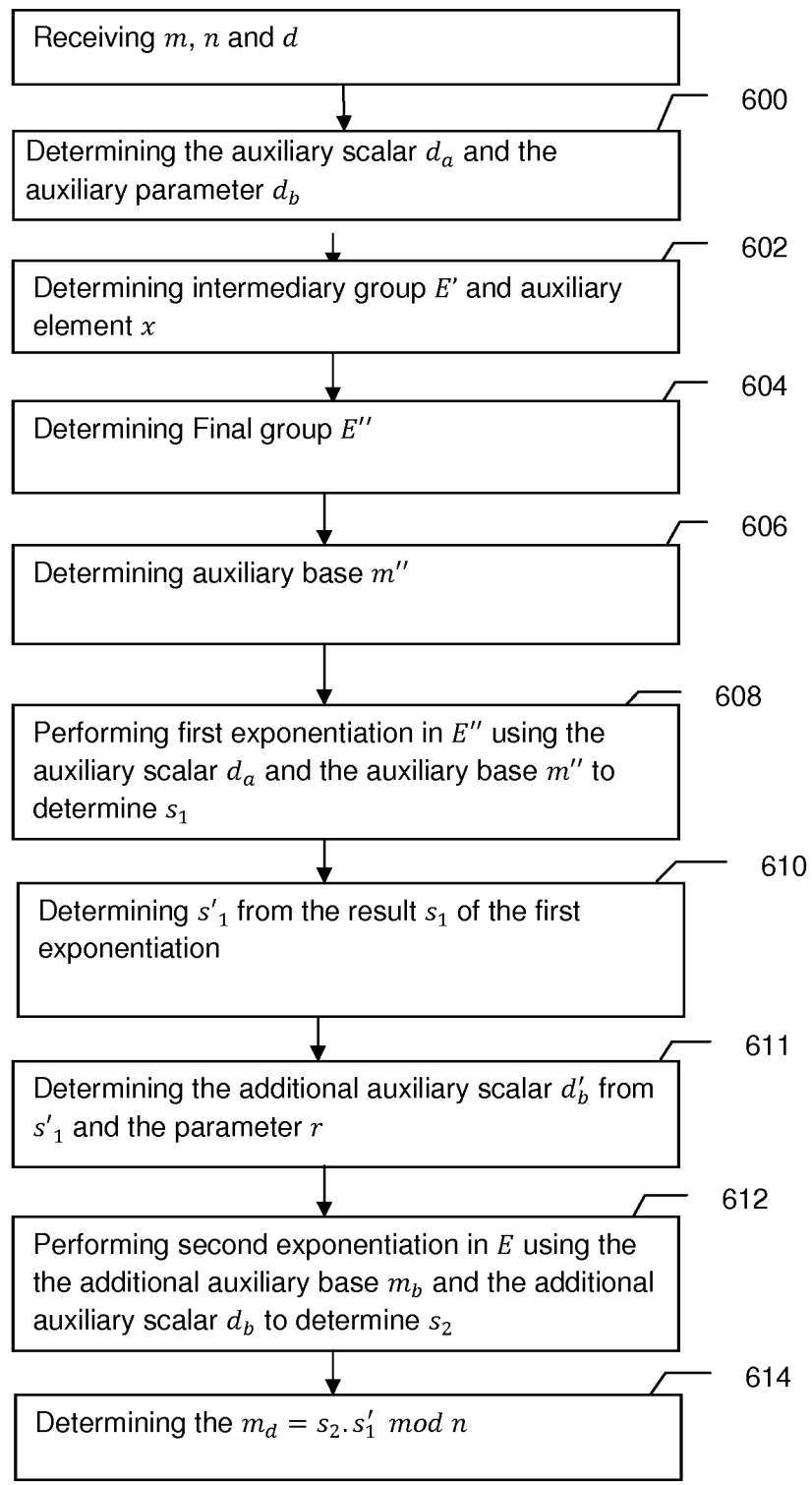
FIG. 6 is a flowchart that depicts a method of protecting execution of a modular exponentiation operation of an RSA based cryptographic algorithm in standard mode, according to one embodiment.

FIG. 6 is a flowchart depicting the exponentiation method for protecting the execution of a cryptographic operation from attacks, using a RSA based cryptographic algorithm in standard mode, according to an embodiment.

In a RSA implementation of the invention, a group (starting, intermediary, final groups) is a group of units of a ring of integers modulo an integer n.

As used herein, a Group of units designates the set of elements of integers modulo n that are invertible. An integer q is "invertible modulo n" if there exists an integer q' such that $q \cdot q' = 1 \mod n$.

A RSA based algorithm in standard mode implements a cryptographic operation corresponding to a modular exponentiation, modulo a modulus n, with n being equal to the product pq of a first system parameter p and a second system parameter q, the base m of the exponentiation operation being the message and the main scalar d of the exponentiation operation corresponding to the public key:

$$S = m^d \mod n \qquad (12)$$

In equation (12), n designates the modulus of the RSA operation (n being an integer).

The exponentiation operation and is defined in the two starting groups E1 and E2 respectively corresponding to the integer group modulo p ($E1 = \mathbb{Z}/p\mathbb{Z}$) and to the integer group modulo q ($E2 = \mathbb{Z}/q\mathbb{Z}$) with p and q being integers, and p and q coprime.

In such a RSA based cryptographic operation, two intermediary groups $E'_1$ and $E'_2$ are determined in step 500, the intermediary groups corresponding to two groups of units of integers modulo a parameter:

a group of units of integers modulo p' (p' may be prime): $E'1 = \mathbb{Z}/p'\mathbb{Z}$, and a group of units of integers modulo q' (q' may be prime): $E'2 = \mathbb{Z}/q'\mathbb{Z}$.

The parameters p' and q' may be integers and coprime; p' and q' may be selected randomly.

Further, in the RSA based cryptographic operation in CRT mode, the starting group is the group of unit of integers modulo: $E' = \mathbb{Z}/n\mathbb{Z}$.

More specifically, in step 600, the auxiliary scalar $d_a$ may be determined from the main scalar d and from a predetermined auxiliary parameter $d_b$ as $d_a = d - d_b$. The auxiliary parameter $d_b$ may be predetermined to be equal to a parameter r. r may be determined randomly and/or may be a odd parameter and/or a prime parameter.

In step 602 (corresponding to step 500 of FIG. 5), one intermediary group E' may be determined, the intermediary group E'=$\mathbb{Z}/r\mathbb{Z}$ being the group of units of integers modulo r, r−1 being of order 2. Further, the auxiliary element x to which the base m is mapped in E' is equal to r−1.

In step 604 (corresponding to step 502 of FIG. 5), one final group E" is determined from E and E', the final group being equal to the following group E" of integer modulo nr: E"=$\mathbb{Z}/nr\mathbb{Z}$.

In step 606 (corresponding to step 504 of FIG. 5), the base m is mapped to the auxiliary base m" in the final group E" by determining:
- a first elementary auxiliary base $m''^{(1)}$ is equal to the main base m modulo the modulus n: $m''^{(1)}$=m mod n; and
- a second elementary auxiliary base $m''^{(2)}$ is equal to x=r−1 mod r.

Step 606 may then comprise applying a CRT (Chinese Remainder Theorem) transformation, using the elementary auxiliary bases $m''^{(1)}$ and $m''^{(2)}$ to determine a unique auxiliary base:

$$m''=CRT(m''^{(1)},m''^{(2)})=m''^{(2)}+r(q_{inv}(m''^{(1)}-m''^{(2)}))\bmod n \quad (13)$$

With:

$$q_{inv}=r^{-1} \bmod n \quad (14)$$

The CRT enables optimization of the computation speed.

In step 608 (corresponding to step 506 of FIG. 5), the first exponentiation operation is performed in the final group E"= $\mathbb{Z}/nr\mathbb{Z}$, the first exponentiation operation consisting in raising the auxiliary base m" to the auxiliary scalar $d_a$ in the group E" which provides $s_1$, the auxiliary scalar $d_a$ being determined from the auxiliary element x and from the main scalar d in step 600:

$$s_1=m''^{d_a} \bmod nr \quad (15)$$

In step 612 (corresponding to step 508 of FIG. 5), the second exponentiation operation is performed in the starting group E=$\mathbb{Z}/n\mathbb{Z}$, the second exponentiation operation consisting in raising an additional auxiliary base $m_b$ equal to the main base m to the additional auxiliary scalar $d'_b$ in each starting group E, which provides a result $s_2$:

$$s_2=m_b^{d'_b} \bmod n = m^{d'_b} \bmod n \quad (16)$$

The additional scalar $d'_b$ may be previously determined or derived from the result $s_1$ of the first exponentiation operation in step 611. In particular, the additional scalar $d'_b$ may be equal to the sum of a quantity $s'_1$, derived from the result $s_1$ of the first exponentiation, modulo the parameter r, and one:

$$d'_b=s_1' \bmod r+1 \quad (17)$$

In some embodiments, the quantity $s'_1$ may be determined in step 610 as being equal to $s'_1=s_1 \bmod n$ ($s_1$ being mapped to $s'_1$ in the starting group E=$\mathbb{Z}/n\mathbb{Z}$).

In step 614, the product $s_2 \cdot s'_1$ of the second exponentiation $s_2$ and of the quantity $s'_1$, corresponding to the result of the first exponentiation operation $s_1$ in the starting group E=$\mathbb{Z}/n\mathbb{Z}$ may be computed. The element corresponding to the obtained product in the starting group E=$\mathbb{Z}/n\mathbb{Z}$ may be determined as the product $s_2 \cdot s_1' \bmod n$, which provides the result of the exponentiation operation: $m_d = s_2 \cdot s'_1 \bmod n$. Such unmasking step removes the randomization effect provided by the choice of randomly generated intermediary group.

The result of the exponentiation operation $m^d$ can be thus obtained by performing the two elementary exponentiation operations, the first exponentiation operation being performed in the final group E"=$\mathbb{Z}/nr\mathbb{Z}$, and the second exponentiation operation being performed in the starting group= $\mathbb{Z}/n\mathbb{Z}$, the scalar of the first exponentiation $d_a$ being determined from the auxiliary element x derived from r and from the main scalar d, the second exponentiation operation (step 612) using the results of the first exponentiation operation (608).

Figure 7:
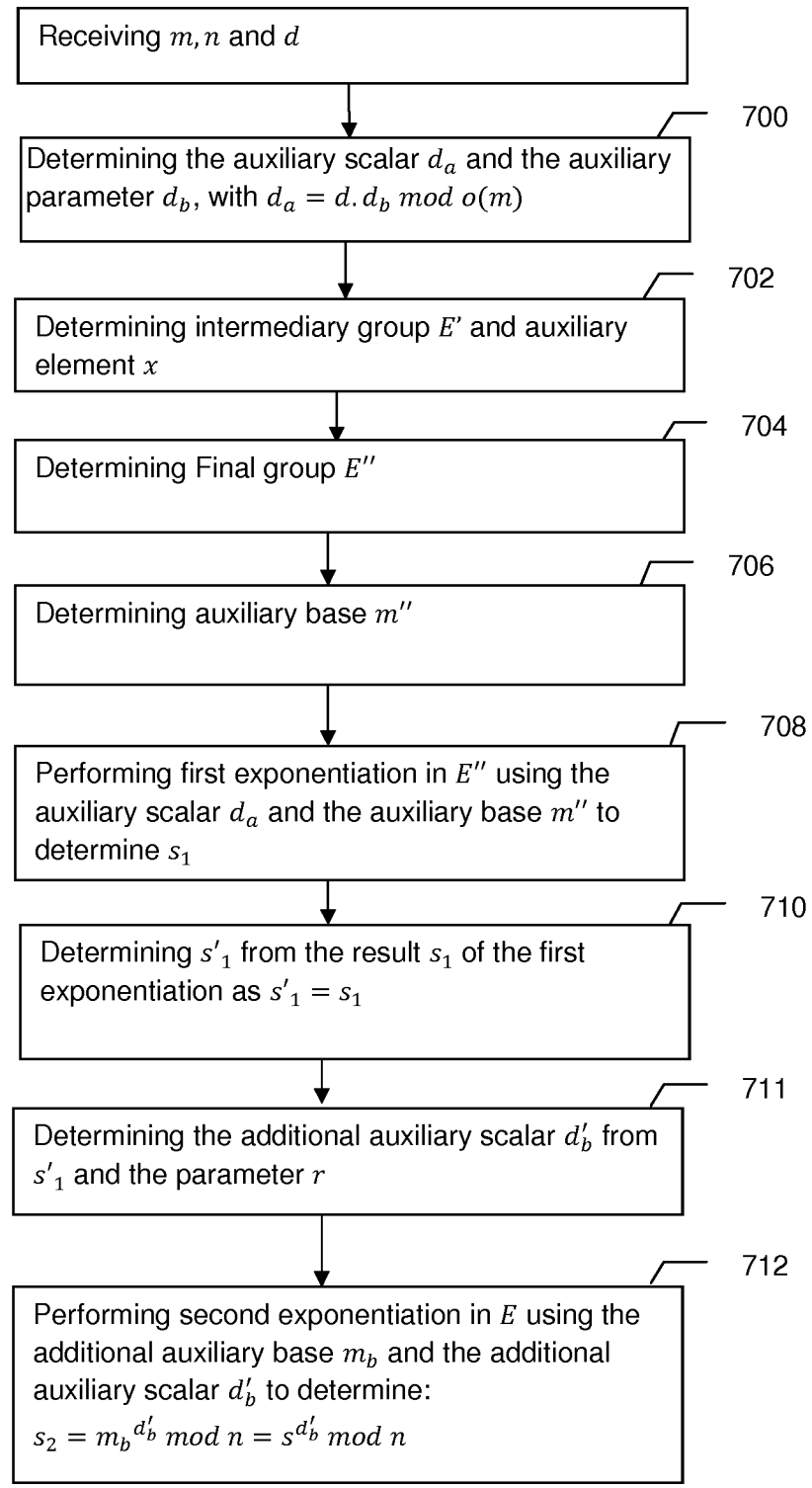
FIG. 7 is a flowchart that depicts a method of protecting execution of a modular exponentiation operation of an RSA based cryptographic algorithm in standard mode, according to another embodiment.

FIG. 7 is a flowchart depicting the exponentiation method for protecting the execution of a cryptographic operation from attacks, according to a second embodiment in which a RSA based cryptographic algorithm, in standard mode, is used. The cryptographic operation also corresponds to the modular exponentiation, modulo a modulus n, with n being equal to the product pq of a first system parameter p and a second system parameter q, the base m of the exponentiation operation being the message and the main scalar d of the exponentiation operation corresponding to the public key:

$$s=m^d \bmod n$$

Steps 702 to 711 of the method of FIG. 7 are respectively similar to steps 602 to 611 of the method of FIG. 6. However, in the embodiment of FIG. 7, the auxiliary scalar $d_a$ is determined in step 700 as the product of the main scalar d and of the parameter $d_b$=r, modulo the order o(m) of the main base m:

$$d_a=d \cdot d_b \bmod o(m) \quad (18)$$

The parameter r may be a random and/or an odd parameter (such as an odd integer) and/or a prime parameter (such as a prime integer).

Further, in step 712, the second exponentiation operation is performed in the starting group E=$\mathbb{Z}/n\mathbb{Z}$ and consist in raising an auxiliary base $m_b$, equal to s=$s'_1$, to the additional auxiliary scalar $d'_b$ in each starting group E, which provides a result $s_2=s^{d'_b} \bmod n$, with s=$s_1'=s_1 \bmod n$ ($s_1$ is mapped to $s'_1$ in the starting group E=$\mathbb{Z}/n\mathbb{Z}$).

In the embodiment of FIG. 7, both the auxiliary scalar $d'_b$ and the auxiliary base $m_b$ are derived from the result $s_1$ of the first exponentiation.

Figure 8:
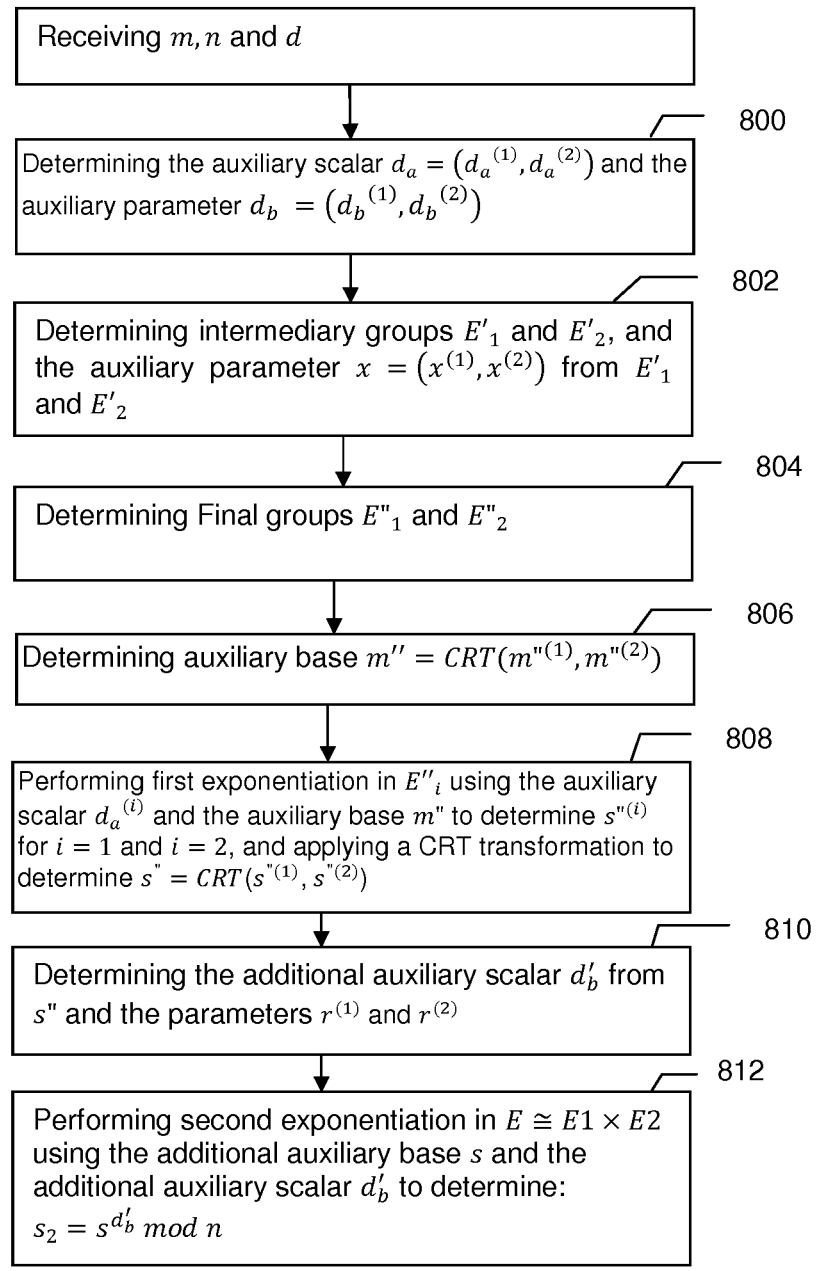
FIG. 8 is a flowchart that depicts a method of protecting execution of a modular exponentiation operation of an RSA based cryptographic algorithm in CRT mode, according to one embodiment.

FIG. 8 is a flowchart depicting the exponentiation method for protecting the execution of a cryptographic operation from attacks, using a RSA based cryptographic algorithm in CRT mode, according to one embodiment. A RSA based algorithm in CRT mode also implements a cryptographic operation corresponding to a modular exponentiation, modulo a modulus n, with n being integer and equal to the product pq of a first system parameter p and a second system parameter q, the base m of the exponentiation operation being the message and the main scalar d of the exponentiation operation corresponding to the public key:

$$s=m^d \bmod n,$$

with n=pq.

In a RSA implementation of the invention in CRT mode, the exponentiation operation $m^d \bmod n$ is defined in the two starting groups E1 and E2 respectively corresponding to the group of integers modulo p (E1=$\mathbb{Z}/p\mathbb{Z}$) and to the group of integers modulo g (E2=$\mathbb{Z}/q\mathbb{Z}$) with p and q being integers, and p and q coprime. p−1 defines the order of the base m in the starting group E1=$\mathbb{Z}/p\mathbb{Z}$ while q−1 defines the order of the base m in the starting group E2=$\mathbb{Z}/q\mathbb{Z}$.

In the embodiment of FIG. 8 using the RSA algorithm in CRT mode, the auxiliary scalar $d_a$ comprises two components $d_a^{(1)}$ and $d_a^{(2)}$:

$$d_a=(d_a^{(1)},d_a^{(2)})$$

Further, the auxiliary component $d_b$ also comprises two components:

$$d_b = (d_b^{(1)}, d_b^{(2)})$$

In step 800, the auxiliary scalar $d_a = (d_a^{(1)}, d_a^{(2)})$ is determined from the main scalar d and from the auxiliary parameter $d_b$. More specifically, the first component $d_a^{(1)}$ of the auxiliary scalar $d_a$ may be determined from the term $d_p \cdot r \cdot \bmod p$ corresponding to the product of a parameter $d_p$ and of a parameter r modulo the system parameter p, with $d_p$ being derived from d and from the first system parameter p according to the following equation:

$$d_p = d \bmod (p-1) \tag{19}$$

In an embodiment, the first component $d_a^{(1)}$ of the auxiliary scalar $d_a$ may be determined as the difference between $d_p$ and 1 (one), according to the following equation:

$$d_a^{(1)} = d_p r \bmod p - 1 \tag{20}$$

In such embodiment, the first component $d_b^{(1)}$ of the auxiliary parameter $d_b$ is set to the parameter: $d_b^{(1)} = r$ The parameter r may be determined randomly and/or may be an odd parameter and/or a prime parameter.

$d_p$ and $d_q$ are representative of the exponent d in the group $E = \mathbb{Z}_p$ and $E = \mathbb{Z}_q$.

In addition, in step 800, the second component $d_a^{(2)}$ of the auxiliary scalar $d_a$ may be determined from the term $d_q \cdot r \cdot \bmod q$ corresponding to the product of a parameter $d_q$ and of a parameter r modulo the second system parameter q, with $d_q$ being derived from d and from the second system parameter q according to the following equation:

$$d_q = d \bmod (q-1) \tag{21}$$

In an embodiment, the second component $d_a^{(2)}$ of the auxiliary scalar $d_a$ may be determined as the difference between $d_q$ and 1 (one), according to the following equation:

$$d_a^{(1)} = d_q r \bmod p - 1 \tag{22}$$

In such embodiment, the second component $d_b^{(2)}$ of the auxiliary parameter $d_b$ may be also set to the parameter r: $d_b^{(2)} = r$.

In step 802 (corresponding to step 500 of FIG. 5), two intermediary groups $E'_1$ and $E'_2$ are determined ($E' \cong E_1 \times E'_2$), the intermediary groups corresponding to two groups of units of integers modulo a parameter $r^{(i)}$. The two intermediary groups $E'_1$ and $E'_2$ comprise:

a first group $E'1$ corresponding to the group of integers modulo a parameter $r^{(1)}$ ($r^{(1)}$ may be prime):

$$E'1 = \mathbb{Z}/r^{(1)}\mathbb{Z}, \text{ and}$$

a second group $E'2$ corresponding to the group of integers modulo a parameter $r^{(2)}$ ($r^{(2)}$ may be prime):

$$E'1 = \mathbb{Z}/r^{(2)}\mathbb{Z}.$$

The parameters $r^{(1)}$ and $r^{(2)}$ may be derived from the parameter r, r being a function $f()$ of $r^{(1)}$ and $r^{(2)}$:

$$r = f(r^{(1)}, r^{(2)})$$

In one embodiment, the parameters $r^{(1)}$ and $r^{(2)}$ may be determined such that they satisfy the following equation:

$$r = r^{(1)} + r^{(2)}, \text{ with } r^{(1)} - 1 \text{ and } r^{(2)} - 1 \text{ being of order 2}.$$

Further, in step 802, the auxiliary element x is determined from the main base m and the intermediary groups $E'1$ and $E'2$. In an RSA implementation in CRT mode, the auxiliary element x also comprises two components $x^{(1)}$, $x^{(2)}$:

$$x = (x^{(1)}, x^{(2)})$$

More specifically, the first component $x^{(1)}$ of the auxiliary component x is the element that corresponds to the main base m in $E'1 = \mathbb{Z}/r^{(1)}\mathbb{Z}$ and the first component $x^{(2)}$ of the auxiliary component x is the element that corresponds to the main base m in $E'2 = \mathbb{Z}/r^{(2)}\mathbb{Z}$. In one embodiment, $x^{(1)}$ and $x^{(2)}$ are defined as follows:

$$x^{(1)} = r^{(1)} - 1 \tag{23}$$

$$x^{(2)} = r^{(2)} - 1 \tag{24}$$

The base m is mapped to the auxiliary element x in the intermediary groups E'.

In step 804 (corresponding to step 502 of FIG. 5), two final groups $E''_1$ and $E''_2$ are determined from the starting groups ($E_1, E_2$) and the intermediary groups ($E'_1, E'_2$). In particular, the final groups $E''_1$ and $E''_2$ may comprise:

a first final group $E''_1$ being equal to the group of integers modulo $pr^{(1)}$:

$$E''_1 = \mathbb{Z}/pr^{(1)}\mathbb{Z};$$

a second final group $E''_2$ being equal to the group of integers modulo $qr^{(2)}$:

$$E''_2 = \mathbb{Z}/qr^{(2)}\mathbb{Z}.$$

In step 806 (corresponding to step 504 of FIG. 5), the base m is mapped to the auxiliary base m″ in the final groups ($E''_1 = \mathbb{Z}/pr^{(1)}\mathbb{Z}, E''_2 = \mathbb{Z}/qr^{(2)}\mathbb{Z}$). Step 806 comprises determining an elementary auxiliary base $m''^{(i)}$ in each final group (i being equal to 1 or 2) from the corresponding component $x^{(i)}$ of the auxiliary element $x = (X^{(1)}, X^{(2)})$.

In one embodiment, step 806 may comprise determining a first elementary auxiliary base $m''^{(1)}$ in the first final group $E''_1 = \mathbb{Z}/pr^{(1)}\mathbb{Z}$ such that:

the first elementary auxiliary base $m''^{(1)}$ is equal to the main base m modulo the modulus p, i.e. $m''^{(1)} = m \bmod p$, and the first elementary auxiliary base $m''^{(1)}$ is equal to $x^{(1)} = r^{(1)} - 1 \bmod r^{(1)}$.

Similarly, step 806 may comprise determining the second elementary auxiliary base $m''^{(2)}$ in the second final group $E''_2 = \mathbb{Z}/qr^{(2)}\mathbb{Z}$ such that:

the second elementary auxiliary base $m''^{(2)}$ is equal to the main base m modulo the modulus q, i.e. $m''^{(2)} = m \bmod q$, and the second elementary auxiliary base $m''^{(2)}$ is equal to $x^{(2)} = r^{(2)} - 1 \bmod r^{(2)}$.

Step 806 may then comprise applying a CRT (Chinese Remainder Theorem) transformation using the elementary auxiliary bases $m''^{(1)}$ and $m''^{(2)}$ to determine a unique auxiliary base:

$$m'' = CRT(m''^{(1)}, m''^{(2)})$$

In step 808 (corresponding to step 506 of FIG. 5), the first exponentiation operation is performed in the final groups $E'' \cong E''_1 \times E''_2$ ($E''_1 = \mathbb{Z}/pr^{(1)}\mathbb{Z}, E''_2 = \mathbb{Z}/qr^{(2)}\mathbb{Z}$), which provides a result s″ derived from two elementary results $s''^{(i)}$. Each elementary result $s''^{(i)}$ may be determined by performing the first exponentiation operation in one of the final group $E''_i$. More specifically, the first exponentiation operation may consist in raising the auxiliary base m″ obtained in step 806 to the each component $d_a^{(i)}$ of the auxiliary scalar $d_a$ in the corresponding group $E''_1$ which provides:

$$s''^{(1)} = m''^{d_a(1)} \bmod pr^{(1)} \text{ in the final group } E''_1 = \mathbb{Z}/pr^{(1)}\mathbb{Z};$$

$$s''^{(2)} = m''^{d_a(2)} \bmod qr^{(1)} \text{ in the final group } E''_2 = \mathbb{Z}/qr^{(2)}\mathbb{Z};$$

In step 808, a CRT transformation may be applied to determine the result of the first exponentiation operation in the final groups from the elementary results $s'''^{(i)}$ determined in each final group $E''_i$;

$$s''' = CRT(s'''^{(1)}, s'''^{(2)})$$

$$m''' = CRT(s'''^{(1)}, s'''^{(2)}) = m'''^{(2)} + qr(q_{inv}(s'''^{(1)} - s'''^{(2)})) \mod pr \quad (25)$$

With:

$$q_{inv} = qr^{-1} \mod pr \quad (26)$$

In step 812 (corresponding to step 508 of FIG. 5), the second exponentiation operation is performed in the starting groups $E \cong E1 \times E2$, with $E1 = \mathbb{Z}/p\mathbb{Z}$ and $E2 = \mathbb{Z}/q\mathbb{Z}$. The second exponentiation operation comprises raising an additional auxiliary base s equal to the result of the first exponentiation modulo pq to an additional scalar $d'_b$, which provides a result $s_2 = s^{d'_b} \mod n$.

The additional scalar $d'_b$ may be previously determined in step 810 from the result s''' of the first exponentiation operation, and from the elementary parameters $r^{(1)}$ and $r^{(2)}$. In particular, the additional scalar $d'_b$ may be determined as the sum:

$$(s''' \mod r^{(1)}) + 1 + (s''' \mod r^{(2)}) + 1 = f(r^{(1)} + 1, r^{(2)} + 1) \quad (27)$$

Figure 9:
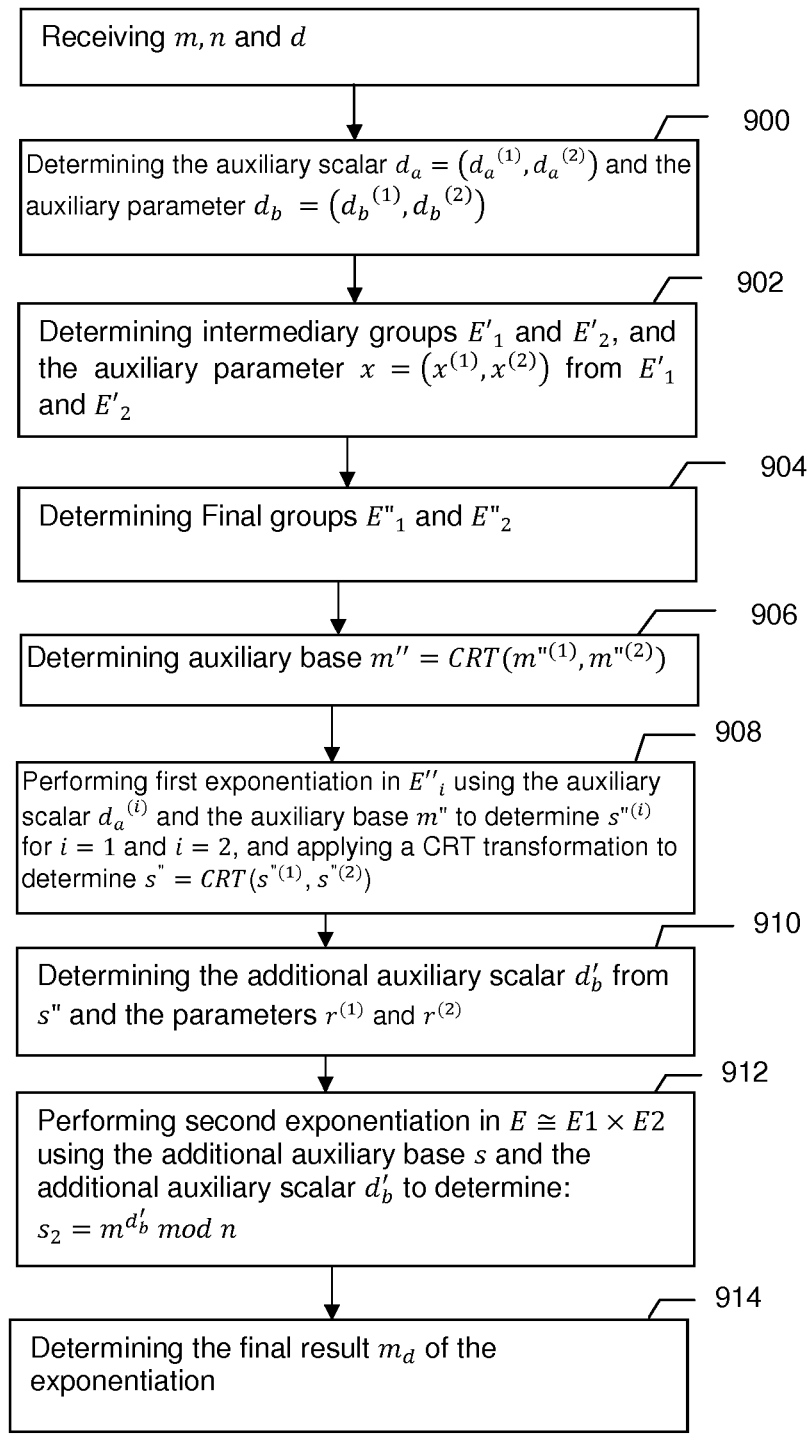
FIG. 9 is a flowchart that depicts a method of protecting execution of a modular exponentiation operation of an RSA based cryptographic algorithm in CRT mode, according to another embodiment.

FIG. 9 is a flowchart depicting the exponentiation method for protecting the execution of a cryptographic operation from attacks, using a RSA based cryptographic algorithm in CRT mode, according to another embodiment. Similarly to the embodiment of FIG. 8, the cryptographic operation corresponds to the modular exponentiation:

$$s = m^d \mod n, \text{ with } n = pq$$

The method of FIG. 9 for executing this operation differs from the method of FIG. 8 in that the components of the auxiliary scalar $d_a$ is determined in step 900 (instead of step 800) as:

$$d_b = (d_b^{(1)}, d_b^{(2)})$$

In step 900, the auxiliary scalar $d_a = (d_a^{(1)}, d_a^{(2)})$ is determined from the main scalar d and from the auxiliary parameter $d_b$. More specifically, the first component $d_a^{(1)}$ of the auxiliary scalar $d_a$ may be determined as equal to the difference between the parameters $d_p$ and r:

$$d_a^{(1)} = d_p - r \quad (28)$$

In equation (27), the parameter $d_p$ is given by:

$$d_p = d \mod(p-1) \quad (29)$$

In such embodiment, the first component $d_b^{(1)}$ of the auxiliary parameter $d_b$ is set to the parameter r: $d_b^{(1)} = r$. Similarly to the embodiment of FIG. 8, the parameter r may be determined randomly and/or may be an odd parameter and/or a prime parameter.

In addition, in step 900, the second component $d_a^{(2)}$ of the auxiliary scalar $d_a$ may be determined as equal to the difference between the parameters $d_p$ and r:

$$d_a^{(2)} = d_p - r \quad (30)$$

In equation (29) the parameter $d_p$ is given by:

$$d_p = d \mod(p-1) \quad (31)$$

The second component $d_b^{(1)}$ of the auxiliary parameter $d_b$ is also set to the parameter r:

$$d_b^{(2)} = r.$$

Steps 902 to 910 of the method of FIG. 9 are respectively similar to steps 802 to 810 of FIG. 8. In particular, in step 908, a first exponentiation is performed, similarly to step 808 of FIG. 8, which provides $s''' = CRT(s'''^{(1)}, s'''^{(2)})$. Further, in step 910, the additional scalar $d'_b$ is determined from s''' and the parameters $r^{(1)}$ and $r^{(2)}$ similarly to step 810 of FIG. 8.

In step 912, a second exponentiation operation is performed which comprises raising an auxiliary base $m_{db}$ equal to the main base m (instead of s which is derived from the result of the first exponentiation in step 812 of FIG. 8) to the additional auxiliary scalar $d'_b$ in each starting group E, which provides a result $m_{db} = m^{d'_b} \mod n$.

The method of FIG. 9 further comprises an additional step 914. In such step 914, the final result $m_d$ of the exponentiation operation is determined by computing the product of the result of the second exponentiation $m_{db}$ by s modulo n: $m_d = s \cdot m_{db} \mod n$.

Step 914, similarly to step 614 of FIG. 6, makes it possible to obtain the correct result by removing the randomization r.

Accordingly, in all RSA based implementation of the invention, at least the scalar $d_b$ of the second exponentiation is derived from the result of the first exponentiation.

Embodiments of the invention provide a protection against fault injection attack that either rely on injection of fault in the conventional exponentiation elementary operations (1) and (2) or during post check operation. According to the embodiments of the invention, the second elementary exponentiation $s_2 = m_b^{d'_b}$ cannot be skipped. Indeed, if the exponentiation is skipped, the result of the exponentiation operation is not correct for the two modulus p and q (in a RSA embodiment) and the attack necessarily fails. It should be noted that the last exponentiation $s_2 = m_b^{d'_b}$ does not require to be protected against Side-Channel Analysis. Further, the knowledge of the parameter $r = d_b$ does not bring any vulnerability. Moreover, the modulus n = pq is public. Further, the final exponentiation may advantageously be done with very fast implementations.

In some embodiments, $r = d_b$ may be chosen such that it verifies one or more properties to fasten the operation. In an embodiment, it may be random. Indeed, if the true value r can be guessed and the final exponentiation is skipped using a fault, the attack may potentially be possible. In particular, the value r may be determined to be:
  small;
  of small Hamming Weight (that is "hollow" or "sparse").

Although some embodiments of the invention have been described mainly in relation with RSA based applications of the invention, the invention is not limited to such application and may apply to other cryptographic algorithms involving at least one modular operation performed in one or more starting groups and consisting in d iterations of the internal law of the starting groups using the main base m as operand, such as ECC, Diffie-Hellman key exchange protocol or some quantum-safe version of signature, asymmetric encryption and key exchange protocols.

Figure 10:
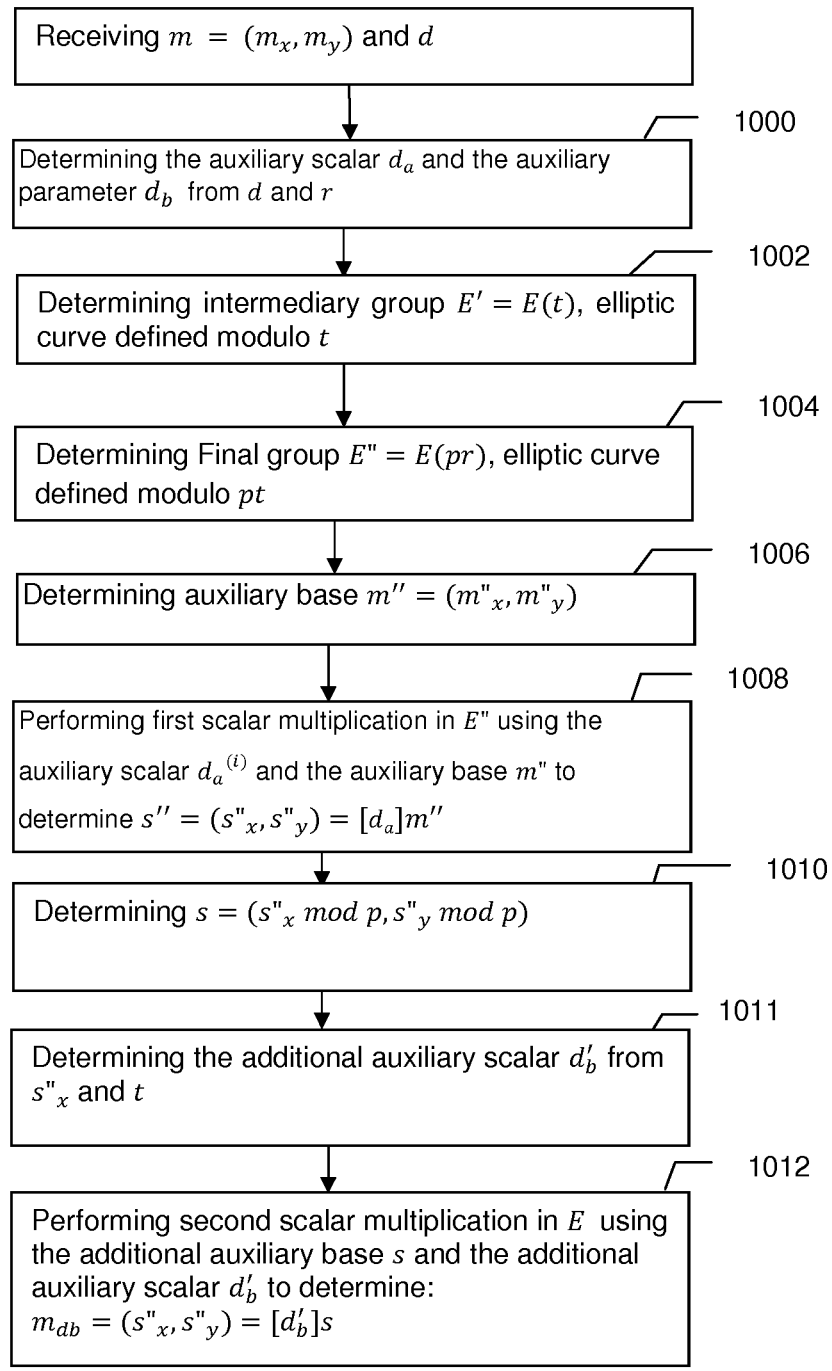
FIG. 10 is a flowchart that depicts a method of protecting execution of a scalar multiplication operation of a ECC based cryptographic algorithm in standard mode, according to one embodiment.

FIG. 10 is a flowchart depicting the exponentiation method for protecting the execution of a ECC based cryptographic operation from attacks, according to some embodiments.

In ECC, a group (starting, intermediary, final) is an elliptic curve noted E (k) defined modulo k. Further, in ECC, the CRT may be applied to the coefficients of the points while the points are element of the set.

ECC may be used to send encrypted messages or to sign messages. ECC is based on the use of:
  an Elliptic curve E (t) defined in a finite field;
  a base point m which is an elliptic curve base point which is a generator of the elliptic curve with prime order n;
  the integer order n of the elliptic curve base point m.

Elliptic curves are defined as a set of points satisfying a some cubic equation called the Weierstrass Equation in some field $\mathbb{K}$, i.e., as the graph of the Weierstrass Equation. Mathematically, they represent a special class of planar curves. Elliptic curves and their points can be expressed in a variety of representations such as affine coordinates, projective coordinates, Jacobian coordinates, or Montgomery form.

Elliptic curves used in cryptography are defined over a prime field $\mathbb{F}_p$ with p prime or over a binary field $\mathbb{F}_{2^t}$ for some large $t \in \mathbb{N}$. They are particularly suitable for an implementation of embedded devices that have memory constraints.

Encryption with ECC consists in creating a key pair consisting of a private key integer d and a public key curve point Q=[d] m which denotes the elliptic curve point multiplication by an integer scalar d, i.e. the operation of successively adding a point along the elliptic curve to itself repeatedly. More specifically, given the curve, E, defined along an equation in a finite field (such as for example E: $y^2=x^3+ax+b$), point multiplication is defined as the repeated addition of a point along that curve denoted as dP= P+P+P+ . . . +P for some scalar (integer) d and a point m=($m_x$, $m_y$) that lies on the curve, E (e.g. Weierstrass curve). The base point m is noted as m=($m_x$,$m_y$) and d denotes the scalar. The security of an ECC base system depends on the intractability of determining d from Q=[d]m given known values of Q and m.

In a ECC implementation of the invention, the starting group E corresponds to a finite field $\mathbb{F}_q$, where q is the power of a prime. As used herein, a finite field refers to a field with a finite number of elements.

In embodiments of the invention using a ECC cryptographic algorithm lying on the elliptic curve E(p) defined modulo p, in a coordinate system over the finite field $\mathbb{F}_q$, the cryptographic device 2 thus executes a cryptographic operation [d]m involving at least one modular operation, the modular operation corresponding to the scalar multiplication between a binary number d and the point m=($m_x$, $m_y$) of the elliptic curve E(p), the binary point d being the key and corresponding to the main scalar and the point m=($m_x$,$m_y$) corresponding to the main base.

The main base m comprises two components (m=($m_x$, $m_y$)), one component $m_x$ according to the X axis and another component $m_y$ according to the Y axis, the X and Y axis corresponding to the referential used to represent the elliptic curve.

In a ECC implementation of the invention, the execution of the scalar multiplication [d]m is protected by performing two elementary scalar multiplications, the first elementary scalar multiplication being performed in the final group E' and the second elementary scalar multiplication being performed in the starting group, the scalar and the base point of the second elementary scalar multiplication being derived from the result of the first elementary scalar multiplication.

In step 1000, the auxiliary scalar $d_a$ may be determined from the main scalar d and from the auxiliary parameter $d_b$. In particular, the auxiliary scalar $d_a$ may be equal to the product of the main scalar d by the auxiliary parameter $d_b$ modulo the modulus: $d_a$=d·r mod n, where n corresponds to the order of the base point m and the auxiliary parameter $d_b$ is equal to a parameter r ($d_b$=r).

The parameter r may be determined randomly and/or may be an odd parameter and/or a prime parameter.

In step 1002 (corresponding to step 500 of FIG. 5), one intermediary group E' is determined. The intermediary group may be set to E'=E(t), with E(t) corresponding to the elliptic curve defined modulo t with at least one point x=P=(r, $P_y$) of order 2. The base m is mapped to an auxiliary element x in the intermediary group E'=E(t) (corresponding to the determination of the auxiliary element x in the intermediary group E' of step 504 of FIG. 5).

In step 1004 (corresponding to step 502 of FIG. 5), one final group E" may be determined from the starting group E and the intermediary group E'. In an embodiment, the final group E" may be determined as: E"=E(pt), being an elliptic curve modulo pt.

In step 1006 (corresponding to the determination of the auxiliary base m" in the intermediary group E" of step 504 of FIG. 5), the base m is mapped to the auxiliary base m" in the final group E"=E (pr). The auxiliary base m"=(m"$_x$,m"$_y$) comprises a first component m"$_x$ according to the X axis and a second component m"$_y$ according to the Y axis.

The first component m"$_x$ of the main base m" (X coordinate), defined according to the X axis, may be derived from the first component of the main base $m_x$ according to the axis X and from the modulus p of the elliptic curve E(p) defining the starting group E. The second component m"$_y$ of the main base m" defined according to the Y axis (Y coordinate) may be derived from the Y-coordinate of the main base $m_y$, from the parameter r and from the Y coordinate $P_y$ of the auxiliary element x=(r, $P_y$). In particular, m"$_x$ and m"$_y$ may be defined such that:

$$m''_x = m_x \bmod p \quad (32)$$

$$m''_y = m_y \bmod p \quad (33)$$

$$m''_x = r, m''_y = P_y \bmod r \quad (34)$$

m"$_x$ and m"$_y$ may be determined using the CRT. CRT may also be applied similarly to RSA based embodiments, using two bases instead of one (for coordinates x+y).

In step 1008, the first ECC scalar multiplication (ECSM) operation is performed in the group E", the first ECSM operation consisting in performing the scalar product of the auxiliary base point (m") and of the auxiliary scalar $d_a$ in the final group E"=E (pr), which provides the result:

$$s = (s''_x, s''_y) = [d_a] \cdot m'' \quad (35)$$

In equation (34), s has two coordinates s"$_x$ (X coordinate) and s"$_y$ (Y coordinate) respectively according to X and Y axis.

In step 1012, the first ECC scalar multiplication (ECSM) operation is performed in the starting group E=E(p), the second ECCM operation consisting in performing the scalar multiplication of an additional auxiliary base point s and of an additional auxiliary scalar d'$_b$ in the starting group E, which provides the result:

$$m_{db} = [d'_b] \cdot s \quad (36)$$

In steps 1008 and 1012, the ECSM operations [$d_a$]·m" and [d'$_b$]·s may be computed using a conventional ECSM algorithm, such as by using double-and-add approach (doubling of a point and addition of two different points). Each ECSM operation of the type [k]Q may thus be performed through repeated doubling and addition amounting to performing exponentiation. Indeed, to compute [k]Q, a representation may be used for k which is based on $\Sigma_{i=0}^{i=M} 2^{iw} k_i$ mod, using doubling of a point and addition of two different points, for example (double-and-add approach).

The additional auxiliary base point s may be previously determined in step 1010 from the coordinates s"$_x$ and s"$_y$, of the result s" of the first ECC scalar multiplication, and from the modulus of the starting group E=E(p). In an embodiment, the additional auxiliary base point s=($s_x$,$s_y$) is determined, with the coordinate $s_x$ according to the X axis being determined as equal to $s''_x$ mod p and the coordinate $s_y$ according to the Y axis being determined as equal to $s''_y$, mod p:

$$s = (s''_x \bmod p, s''_y \bmod p) \quad (37)$$

The additional auxiliary scalar $d'_b$ may be previously determined in step 1011 from the X coordinate $s''_x$ of the result s" of the first ECC scalar multiplication. In particular, the additional auxiliary scalar $d'_b$ may be equal to $s''_x$, corresponding to the coordinate X of the result s" of first ECC scalar multiplication, modulo the modulus t of the elliptic curve of the intermediary group E'=E (t):

$$d'_b = s''_x \bmod t \quad (38)$$

Whatever the result s, the embodiments of the invention thus ensure that the result s cannot be used by an attacker to hack the system. Indeed, ifs is equal to [d]·m in E, no fault occurred and the result is correct. Ifs is not equal to [d]·m in E, the result may be faulty but the result still cannot be used by an attacker to guess the secrete data.

Figure 11:
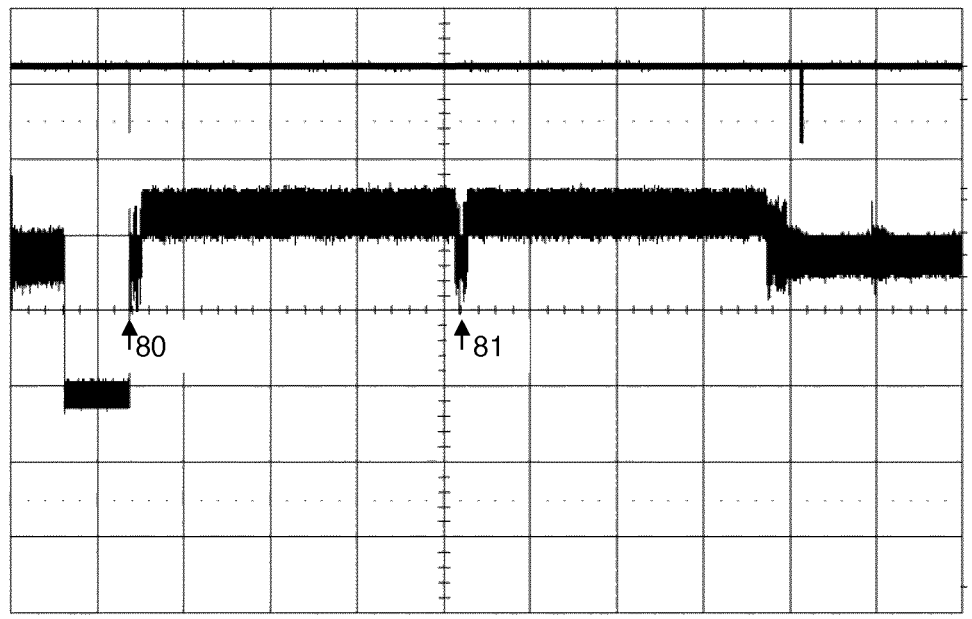
FIG. 11 shows a diagram representing Electromagnetic Radiation during execution of a RSA cryptographic algorithm without countermeasure according to the prior art.
Figure 12:
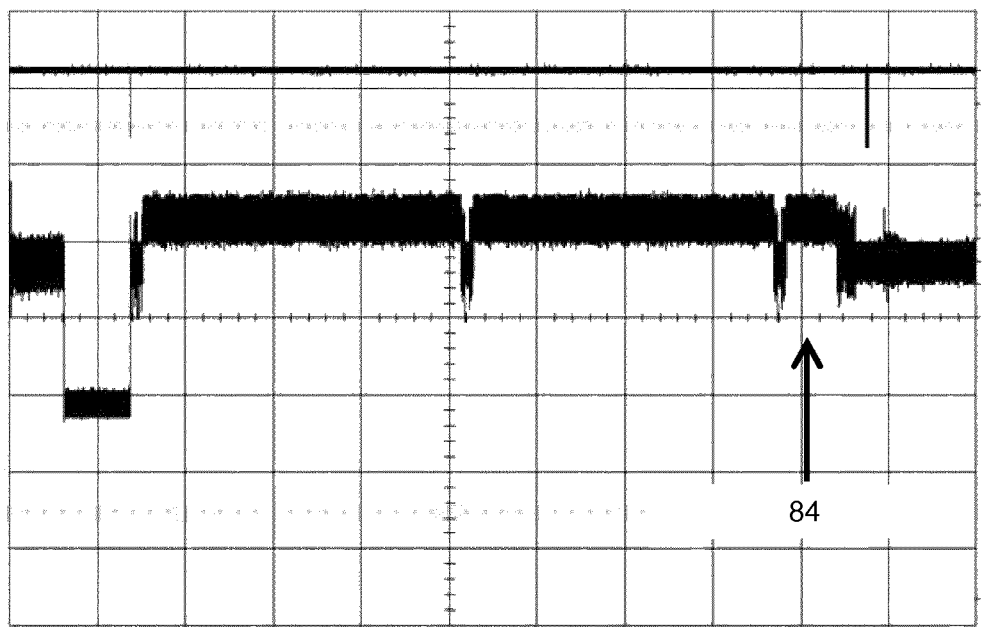
FIG. 12 shows a diagrams representing Electromagnetic Radiation during execution of a RSA cryptographic algorithm with the countermeasure according to some embodiments.

FIG. 11 is an Electromagnetic Radiation diagram showing an RSA exponentiation operation according to the prior art in comparison with the characteristic Electromagnetic Radiation diagram of FIG. 12 showing an RSA exponentiation operation according to embodiments of the invention. In FIG. 11, references 80 and 81 designate the two conventional exponentiation operations (1) and (2) performed in steps 202 and 204 of FIG. 3. In FIG. 12, the second elementary exponentiation corresponds to the peak designated by reference 84.

The invention may have a significant impact to improve resistance to fault injection for use in a cryptographic system implemented in an embedded system, such as smartcards, but also for use in a cryptographic scheme implemented in a M2M platform or terminal in IoT architecture (Internet of Things).

More generally, the invention may be implemented in any device or system incorporating secret data and potentially exposed to side-channel and/or fault attacks, such as a smart card, a smart phone, a smart meter, a secure device, a multimedia player, a recorder, or a mobile storage device like memory cards and hard discs, or the like. The IC device may be used in a wide range of communication and data processing applications such as in the automotive industry, in secure access solutions, in mobile phone devices, in payment domains such as banking schemes, etc. It should be noted that the invention also ensure protection against particular attacks such as side-channel analysis which can be conducted by the time access on the micro-architecture (also referred to as cache attacks) and/or fault obtained by over solicitation of the memories (also called "Row Hammer" Attacks).

Additional advantages and modifications will readily appear to those skilled in the art. The invention in its broader aspects is therefore not limited to the specific details, representative methods, and illustrative examples shown and described. In particular, although the invention has particular advantages for a RSA or ECC based cryptographic system, it generally applies to any cryptographic algorithm making use of a modular operation comprising d iterations of the internal law of the starting groups on a main base.

Embodiments of the present invention can take the form of an embodiment containing software only, hardware only or both hardware and software elements.

Furthermore, the cryptography methods described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions/acts specified herein.

The above described embodiments may be combined when appropriate and are provided for illustration purposes only.

The invention claimed is:

1. A computer implementing one or more cryptographic mechanisms, the computer comprising a cryptographic processor device configured to (i) execute a cryptographic operation related to said one or more cryptographic mechanisms and (ii) protect an execution of the cryptographic operation from attacks, said cryptographic operation being implemented by a cryptographic algorithm, said cryptographic operation comprising at least one modular operation between a main base (m) representing a data block and at least one scalar (d) in at least one finite starting group, wherein said cryptographic processor device comprises hardware that comprises a group determination unit:

said group determination unit being configured to determine at least one intermediary group (E') different from at least one starting group (E), a number of the at least one intermediary group (E') being equal to a number of said at least one starting group (E); and said group determination unit being configured to determine at least one final group (E") from said at least one starting group (E) and said at least one intermediary group (E');

said cryptographic processor device being configured such that the main base (m) is mapped to an auxiliary element (x) in said at least one intermediary group (E') and to an auxiliary base (m") in said at least one final group (E"), said auxiliary element (x) being determined from a parameter (r), the parameter (r) being at least one of determined randomly, an odd parameter, or a prime parameter; and wherein said cryptographic processor device further comprises hardware that comprises an execution engine for executing each modular operation, said execution engine comprising:

a first unit configured to perform a first elementary operation in each final group (E"i), the first elementary operation comprising executing said modular operation between said auxiliary base (m") and an auxiliary scalar ($d_a$) in each at least one final group (E"), which provides at least one result, the auxiliary scalar ($d_a$) being determined from the main scalar (d), and a second unit configured to perform a second elementary operation in each at least one starting group (E), the second elementary operation comprising executing said modular operation between an additional auxiliary base and an additional auxiliary scalar ($d'_b$) in each at least one starting group, at least one of the additional auxiliary base and of the additional auxiliary scalar ($d'_b$) being determined from the at least one result of the first elementary operation, wherein the cryptographic processor device is configured to implement the group determination unit, the first unit, and the second unit in an electronic device, a computer device, and/or a system; and wherein the cryptographic processor device is configured to protect the execution of the cryptographic operation in the electronic device, the computer device, and/or the system from attacks.

2. The computer of claim 1, wherein each modular operation between a base and a scalar in at least one given finite group comprises one or more iterations of a basis operation on the base (m) in said at least one finite group modulo an integer representing an order of said at least one group, said at least one group being associated with a given internal law, a number of iterations being defined by said at least one scalar, said basis operation being defined by the internal law of the group.

3. The computer of claim 1, wherein the cryptographic processor device is further configured to determine an auxiliary parameter ($d_b$) as a function of said main scalar (d) and of said at least one auxiliary scalar ($d_a$).

4. The computer of claim 3, wherein said main base is associated with a given order (r), a product of the auxiliary scalar ($d_a$) and of the auxiliary parameter ($d_b$) being equal to the main scalar (d) modulo the order of the base (r).

5. The computer of claim 3, wherein a sum of the first auxiliary scalar ($d_a$) and of the auxiliary parameter ($d_b$) is equal to the main scalar (d).

6. The computer of claim 3, wherein the auxiliary element (x) is determined from the auxiliary scalar ($d_a$) and the auxiliary parameter ($d_b$).

7. The computer of claim 1, wherein the cryptographic algorithm is a Rivest, Shamir, and Adleman (RSA) algorithm, the RSA cryptographic algorithm being associated with a private key d, a public key e and a first and second system parameters (p, q), the system parameter being coprime, the public key (e) being prime to the first system parameter minus one, and to the second system parameter minus one, said modular operation being a modular exponentiation performed in two starting groups, a modulus being equal to a product of the first and second system parameters (pq), the main scalar (d) corresponding to the public key.

8. The computer of claim 6, wherein said auxiliary element (x) is determined such that the auxiliary parameter ($d_b$) is equal to said auxiliary element (x) raised to the first auxiliary scalar ($d_a$), in said intermediary group, plus one.

9. The computer of claim 7, wherein said step of determining at least one intermediary group (E') comprising determining at least two intermediary group (E'1, E'2).

10. The computer of claim 9, wherein said auxiliary element (x) is determined by solving an equation according to which the auxiliary parameter ($d_b$) is equal to a sum of the auxiliary element (x) raised to the first auxiliary scalar ($d_a$) in each intermediary group.

11. The computer of claim 1, wherein the cryptographic algorithm is an Elliptic Curve Cryptography algorithm lying on a given elliptic curve, and said cryptographic operation is a scalar multiplication between a binary number and a point of the elliptic curve defined in a coordinate system over a finite field, the binary point being a key.

12. The computer of claim 6, wherein said auxiliary element (x) is determined such that the second auxiliary scalar ($d_b$) is equal to one of a coordinate of the result point obtained by solving an equation according to which the auxiliary parameter ($d_b$) is equal to the auxiliary element x raised to the first auxiliary scalar in said intermediary group.

13. The computer of claim 1, wherein said additional auxiliary scalar ($d_b'$) is the element corresponding to the result of the first elementary operation (s") in said at least one intermediary group (E').

14. The computer of claim 1, wherein said additional auxiliary base (s) is the element corresponding to the result of the first elementary operation (s") in said at least one starting group (E).

15. The computer of claim 1, wherein the execution engine is further configured to determine a product of the result of the second elementary operation by said additional auxiliary base (s), said product ($m_d$) representing the result of said modular operation.

16. The computer of claim 1, wherein said cryptographic algorithm is based on the result of a cryptographic operation using at least one modular operation, wherein said computer comprises a device according to claim 1 to perform said at least one modular operation.

17. A cryptographic method implemented in a computer implementing one or more cryptographic mechanisms, the computer executing a cryptographic operation related to said one or more cryptographic mechanisms, said cryptographic method comprising:

protecting an execution of the cryptographic operation from attacks, said cryptographic operation being implemented by a cryptographic algorithm executed by a processor, said cryptographic operation comprising at least one modular operation between a main base (m) representing a data block and at least one scalar (d) in at least one finite starting group;

determining with a group determination unit, implemented by hardware, at least one intermediary group (E') different from at least one starting group (E), a number of intermediary groups being equal to a number of said at least one starting group (E);

determining with the group determination unit, at least one final group (E") different from said at least one starting group (E) and said at least one intermediary group (E');

wherein the main base (m) is mapped to an auxiliary element (x) in said at least one intermediary group (E') and to an auxiliary base (m") in said at least one final group (E"), said auxiliary element (x) being determined from a parameter (r), the parameter (r) being at least one of determined randomly, an odd parameter, or a prime parameter;

performing with a first unit, implemented by hardware, a first elementary operation in each final group (E"i), the first elementary operation comprising executing said modular operation between said auxiliary base (m") and an auxiliary scalar ($d_a$) in each final group (E"), which provides at least one result, the auxiliary scalar ($d_a$) being determined from the main scalar (d); and performing with second first unit, implemented by hardware, a second elementary operation in each starting group (E), the second elementary operation comprising executing said modular operation between an additional auxiliary base and an additional auxiliary scalar ($d'_b$) in each starting group, at least one of the additional auxiliary base and of the additional auxiliary scalar ($d'_b$) being determined from the result of the first elementary operation, wherein the cryptographic method implemented in the computer is configured to implement the group determination unit, the first unit, and the second unit in an electronic device, a computer device, and/or a system; and wherein the processor is configured to protect the execution of the cryptographic operation in the electronic device, the computer device, and/or the system from attacks.

* * * * *